(12) United States Patent
Yasuda et al.

(10) Patent No.: US 9,544,691 B2
(45) Date of Patent: Jan. 10, 2017

(54) ACOUSTIC PLAYBACK SYSTEM

(71) Applicant: Trigence Semiconductor, Inc., Tokyo (JP)

(72) Inventors: Akira Yasuda, Tokyo (JP); Jun-ichi Okamura, Tokyo (JP)

(73) Assignee: Trigence Semiconductor, Inc., Tokyo (JP)

( * ) Notice: Subject to any disclaimer, the term of this patent is extended or adjusted under 35 U.S.C. 154(b) by 0 days.

(21) Appl. No.: 14/722,780

(22) Filed: May 27, 2015

(65) Prior Publication Data

US 2015/0310024 A1    Oct. 29, 2015

Related U.S. Application Data

(63) Continuation of application No. 12/929,070, filed on Dec. 28, 2010, now Pat. No. 9,219,960, which is a
(Continued)

(30) Foreign Application Priority Data

Dec. 16, 2009    (JP) ................................. 2009-284968

(51) Int. Cl.
*G06F 17/00* (2006.01)
*H04R 3/14* (2006.01)
(Continued)

(52) U.S. Cl.
CPC ............. *H04R 3/14* (2013.01); *G06F 17/3074* (2013.01); *H04R 3/12* (2013.01); *H04R 2420/00* (2013.01);
(Continued)

(58) Field of Classification Search
CPC ............. G06F 17/3074; H04R 2420/00; H04R 2420/03; H04R 2420/05; H04R 2430/01; H04R 2430/03; H04R 2499/13; H04R 3/12; H04R 3/14
(Continued)

(56) References Cited

U.S. PATENT DOCUMENTS 4,566,120 A    1/1986  Nieuwendijk et al.
5,404,142 A    4/1995  Adams et al.
(Continued)

FOREIGN PATENT DOCUMENTS

CN    1204895 A    1/1999
CN    1310575 A    8/2001
(Continued)

OTHER PUBLICATIONS

Machine translation of WO2007135928: published Nov. 2007.*
(Continued)

*Primary Examiner* — Paul McCord
(74) *Attorney, Agent, or Firm* — Typha IP LLC

(57) ABSTRACT

An acoustic playback system including a digital filter; and a plurality of digital modulators each of which output a digital signal to one of a plurality of speakers driven by digital signals having different play back bandwidths; wherein the digital filter converts a digital audio signal which is input into a plurality of digital audio signals of a plurality of frequency bandwidths corresponding to play back bandwidths of the speakers, and outputs each of the digital audio signals of the plurality of frequency bandwidths to one of the plurality of digital modulators; each of the digital modulators outputs the modulated digital signal to the speaker of a play back bandwidth corresponding to a frequency bandwidth of the digital audio signal which is input by performing miss-match shaping after noise shaping to a digital audio
(Continued)

signal; and each number of bits of a digital signal of the digital modulators is different.

5 Claims, 31 Drawing Sheets

Related U.S. Application Data continuation of application No. PCT/JP2010/069504, filed on Nov. 2, 2010.

(51) Int. Cl.
*G06F 17/30* (2006.01)
*H04R 3/12* (2006.01)

(52) U.S. Cl.
CPC ....... *H04R 2420/03* (2013.01); *H04R 2420/05* (2013.01); *H04R 2430/01* (2013.01); *H04R 2430/03* (2013.01); *H04R 2499/13* (2013.01)

(58) Field of Classification Search
USPC .......................................................... 700/94
See application file for complete search history.

(56) References Cited

U.S. PATENT DOCUMENTS

| | | | |
|---|---|---|---|
| 5,530,750 A * | 6/1996 | Akagiri | G11B 20/00007 380/28 |
| 5,592,559 A * | 1/1997 | Takahashi | H04L 25/4902 381/111 |
| 5,856,799 A | 1/1999 | Hamasaki et al. | |
| 5,862,237 A | 1/1999 | Kishigami et al. | |
| 5,872,532 A | 2/1999 | Yasuda | |
| 5,909,496 A | 6/1999 | Kishigami et al. | |
| 5,982,317 A | 11/1999 | Steensgaard-Madsen | |
| 6,160,894 A | 12/2000 | Kishigami et al. | |
| 6,216,052 B1 * | 4/2001 | Gulick | H03F 1/0211 381/94.5 |
| 6,243,472 B1 | 6/2001 | Bilan et al. | |
| 6,292,124 B1 | 9/2001 | Hanada et al. | |
| 6,476,752 B1 | 11/2002 | Eastty et al. | |
| 6,563,448 B1 | 5/2003 | Fontaine | |
| 6,697,004 B1 | 2/2004 | Galton et al. | |
| 6,807,281 B1 | 10/2004 | Sasaki et al. | |
| 6,930,625 B1 | 8/2005 | Lin | |
| 7,058,463 B1 | 6/2006 | Ruha et al. | |
| 7,089,069 B2 * | 8/2006 | Gabriel | H04R 1/005 310/320 |
| 7,098,828 B2 | 8/2006 | San et al. | |
| 7,439,440 B2 | 10/2008 | Hsu | |
| 7,492,297 B2 * | 2/2009 | Lin | H03M 1/069 341/144 |
| 7,710,300 B2 * | 5/2010 | Kwan | H03M 3/416 341/143 |
| 7,825,986 B2 * | 11/2010 | Chung | H04N 5/775 348/553 |
| 7,889,109 B2 | 2/2011 | Murahashi | |
| 8,306,244 B2 | 11/2012 | Okamura et al. | |
| 8,423,165 B2 | 4/2013 | Yasuda et al. | |
| 8,577,483 B2 * | 11/2013 | Oh | G10L 19/008 700/94 |
| 8,620,005 B2 | 12/2013 | Ma et al. | |
| 9,226,053 B2 * | 12/2015 | Okamura | H04R 1/005 |
| 2001/0022556 A1 | 9/2001 | Masuda | |
| 2002/0084925 A1 | 7/2002 | Dedic et al. | |
| 2003/0018790 A1 | 1/2003 | Nonaka | |
| 2003/0122692 A1 | 7/2003 | Roeckner et al. | |
| 2003/0123678 A1 | 7/2003 | Kemmerer et al. | |
| 2003/0123681 A1 | 7/2003 | Furst et al. | |
| 2003/0156051 A1 | 8/2003 | Brooks et al. | |
| 2003/0179891 A1 | 9/2003 | Rabinowitz et al. | |
| 2004/0004565 A1 | 1/2004 | Melanson | |
| 2004/0017304 A1 | 1/2004 | Heizmann et al. | |
| 2004/0223622 A1 * | 11/2004 | Lindemann | H04R 5/04 381/79 |
| 2005/0012545 A1 | 1/2005 | Mallinson | |
| 2005/0052304 A1 | 3/2005 | Trotter et al. | |
| 2005/0075744 A1 | 4/2005 | Reefman et al. | |
| 2005/0089182 A1 | 4/2005 | Troughton et al. | |
| 2005/0122244 A1 | 6/2005 | Hongoh et al. | |
| 2005/0131558 A1 * | 6/2005 | Braithwaite | H04N 21/234327 700/94 |
| 2005/0168365 A1 | 8/2005 | Kaplan | |
| 2005/0264586 A1 | 12/2005 | Kim | |
| 2006/0007027 A1 | 1/2006 | Ishizuka et al. | |
| 2006/0013413 A1 | 1/2006 | Sakaidani | |
| 2006/0049889 A1 * | 3/2006 | Hooley | H03K 7/08 332/109 |
| 2006/0149402 A1 * | 7/2006 | Chung | H04S 7/307 700/94 |
| 2006/0192703 A1 | 8/2006 | Yen | |
| 2007/0032895 A1 * | 2/2007 | Nackvi | H04R 5/00 700/94 |
| 2007/0121968 A1 | 5/2007 | Na | |
| 2007/0140513 A1 | 6/2007 | Furge | |
| 2007/0223722 A1 * | 9/2007 | Merrey | H04B 3/58 381/77 |
| 2008/0056507 A1 * | 3/2008 | Logvinov | H04B 3/54 381/77 |
| 2008/0186218 A1 | 8/2008 | Ohkuri et al. | |
| 2009/0110217 A1 * | 4/2009 | Yasuda | H03H 15/00 381/120 |
| 2009/0243905 A1 | 10/2009 | Redmayne et al. | |
| 2009/0296954 A1 | 12/2009 | Hooley et al. | |
| 2010/0008521 A1 | 1/2010 | Cohen et al. | |
| 2010/0245142 A1 | 9/2010 | Myles et al. | |
| 2010/0272270 A1 * | 10/2010 | Chaikin | H04R 29/008 381/59 |
| 2011/0150244 A1 | 6/2011 | Lin et al. | |
| 2012/0033837 A1 | 2/2012 | Mitsui et al. | |
| 2012/0099740 A1 | 4/2012 | Ma et al. | |
| 2012/0170765 A1 | 7/2012 | Clemow | |
| 2013/0156231 A1 | 6/2013 | Yasuda et al. | |
| 2014/0029763 A1 | 1/2014 | Takada et al. | |

FOREIGN PATENT DOCUMENTS

| | | |
|---|---|---|
| CN | 1608393 A | 4/2005 |
| CN | 1615588 A | 5/2005 |
| CN | 1636420 | 7/2005 |
| CN | 1702710 A | 11/2005 |
| CN | 101242678 | 8/2008 |
| CN | 101542909 A | 9/2009 |
| CN | 101986721 A | 3/2011 |
| CN | 1972525 B | 12/2011 |
| CN | 101242678 B | 1/2012 |
| CN | 102422650 A | 4/2012 |
| CN | 101257729 B | 3/2013 |
| CN | 103167380 A | 6/2013 |
| EP | 0 712 549 B1 | 11/2000 |
| EP | 1063866 A1 | 12/2000 |
| JP | S56-048698 A | 5/1981 |
| JP | 57-003498 | 1/1982 |
| JP | 57-3498 | 1/1982 |
| JP | 57-138293 | 8/1982 |
| JP | 58-127795 | 8/1983 |
| JP | 2-121497 | 5/1990 |
| JP | H03-066297 A | 3/1991 |
| JP | 03-216025 | 9/1991 |
| JP | 4-35599 | 12/1992 |
| JP | 5-145988 | 6/1993 |
| JP | 5-176387 | 7/1993 |
| JP | H05-199575 A | 8/1993 |
| JP | 6-335082 | 12/1994 |
| JP | 7-131881 | 5/1995 |
| JP | 8-65791 | 3/1996 |
| JP | 8-154058 | 6/1996 |
| JP | 9-46787 | 2/1997 |
| JP | 9-501287 | 2/1997 |
| JP | 9-186601 | 7/1997 |
| JP | 10-13986 | 1/1998 |

(56) References Cited

FOREIGN PATENT DOCUMENTS

| | | |
|---|---|---|
| JP | H10-051888 A | 2/1998 |
| JP | 10-276490 | 10/1998 |
| JP | 11-502981 | 3/1999 |
| JP | 11-112245 | 4/1999 |
| JP | 11-122110 | 4/1999 |
| JP | 11-262084 | 9/1999 |
| JP | 2000-78015 | 3/2000 |
| JP | 2000-228630 | 8/2000 |
| JP | 2000-295049 | 10/2000 |
| JP | 2000-341129 | 12/2000 |
| JP | 2000-341794 A | 12/2000 |
| JP | 2001-36409 | 2/2001 |
| JP | 2002-504277 | 2/2002 |
| JP | 2002-216026 A | 8/2002 |
| JP | 2002-374170 | 12/2002 |
| JP | 2003-513502 | 4/2003 |
| JP | 2003-216163 | 7/2003 |
| JP | 2003-324788 | 11/2003 |
| JP | 2003338758 A | 11/2003 |
| JP | 2004-222251 A | 8/2004 |
| JP | 2005-338763 | 12/2005 |
| JP | 2006-19988 | 1/2006 |
| JP | 2006-067008 A | 3/2006 |
| JP | 2006-109275 | 4/2006 |
| JP | 2006-303618 | 11/2006 |
| JP | 2006-338763 | 12/2006 |
| JP | 2006-339852 A | 12/2006 |
| JP | 2007-281845 A | 10/2007 |
| JP | 2008-67041 | 3/2008 |
| JP | 2008-193160 A | 8/2008 |
| JP | 2009-147928 | 7/2009 |
| JP | 2009-538553 | 11/2009 |
| JP | 2000-269761 | 9/2010 |
| JP | 2010-263332 | 11/2010 |
| JP | 2012-227589 | 11/2012 |
| JP | 2013-157972 | 8/2013 |
| JP | 2013-543715 | 12/2013 |
| WO | WO 95/05034 | 2/1995 |
| WO | 96/31086 | 10/1996 |
| WO | 01/31793 A1 | 5/2001 |
| WO | 03/071827 A2 | 8/2003 |
| WO | 2004040770 A1 | 5/2004 |
| WO | 2007/135928 | 11/2007 |
| WO | 2007/135928 A1 | 11/2007 |
| WO | WO 2007/135928 | 11/2007 |

OTHER PUBLICATIONS

Office Action dated Aug. 26, 2015 regarding a corresponding Chinese Patent Application No. 201210549780.6.
Office Action dated Sep. 8, 2015 regarding a corresponding Japanese Patent Application No. 2014-185599.
Takesaburo Yanagisawa et al., "Piezo-Electric Type Digital Loudspeaker and Dynamic Responses as Digital-to-Analog Converter", Transactions of the Institute of Electronics, Information and Communication Engineers, vol. 72, No. 11, Nov. 1989, pp. 1724-1732.
Takesaburo Yanagisawa et al., "Possibility of Multi-Bits in Piezo-Electric Type Digital Loudspeaker with Compound Driving System", Transactions of the Institute of Electronics, Information and Communication Engineers, vol. 74, No. 6, Jun. 1991, pp. 913-915.
Takesaburo Yanagisawa et al., "Piezo-Electric Type Loudspeaker Driven by 16 bits Digital Signal and its Acoustic Responses", Transactions of the Institute of Electronics, Information and Communication Engineers, vol. J76-A, No. 9, Sep. 1993, pp. 1392-1395.
Hajime Ueno et al., "Digital-driven piezoelectric speaker using multi-bit delta-sigma modulation", The 121st Convention of Audio Engineering Society, Oct. 2006, pp. 1-6.
Kazushige Kuroki et al., "A Digitally Direct Driven Small Loud Speaker", The 13th Regional Convention of Audio Engineering Society, Jul. 2007, pp. 1-6.
Ryota Saito et al., "A Digitally Direct Driven Dynamic-type Loudspeaker", The 124th Convention of Audio Engineering Society, May 2008, pp. 1-8.
Ichiro Fujimori et al., "A Multibit Delta-Sigma Audio DAC with 120-dB Dynamic Range", IEEE Journal of Solid-State Circuits, Aug. 2000, pp. 1-9.
Masanori Shibata et al., "A Cascaded Delta-Sigma DAC with an analog FIR filter reducing mismatch-effects", IEEE, Aug. 2005, pp. 1-5.
Tsuyoshi Soga et al., "A direct digital driving speaker", Acoustical Society of Japan, Sep. 2005, pp. 1-6.
Pieter Rombouts et al., A Study of Dynamic Element-Matching Techniques for 3-level Unit Elements, IEEE Transaction on Circuits and Systems, vol. 47, No. 11, Nov. 2000, pp. 1177-1187.
The extended European search report of EP 10788219.3, which is an EP counterpart of the present application, issued on Jul. 31, 2013.
Office Action issued by the Japanese Patent Office on Sep. 10, 2013 in the related Japanese patent application No. 2011-510759.
Office Action issued by the Japanese Patent Office on Aug. 20, 2013 in the related Japanese patent application No. 2008-314929.
Office Action issued by the Japanese Patent Office on Aug. 20, 2013 in the related Japanese patent application No. 2008-314438.
Extended European Search Report issued on Dec. 11, 2013 in the corresponding European patent application No. 10835733.6.
Office Action issued by the U.S. Patent and Trademark Office on Jan. 13, 2014 in U.S. Appl. No. 13/221,335.
Chinese Office Action issued May 6, 2014 in corresponding Chinese Patent Application No. 201080029610.4.
Japanese Office Action issued Jul. 15, 2014 in corresponding Japanese Patent Application No. 2011-510758.
Japanese Office Action issued Jul. 15, 2015 in corresponding Japanese Patent Application No. 2013-229250.
Partial Translation of JP2009-147928 A.
Office Action issued by the U.S. Patent and Trademark Office on Jul. 14, 2014 in U.S. Appl. No. 13/221,335.
Office Action issued by the U.S. Patent and Trademark Office on Jul. 22, 2014 in U.S. Appl. No. 13/552,270.
Office Action issued by the European Patent Office on Jul. 22, 2014 in the corresponding European patent application No. 10 788 219.3.
Office Action issued by the Chinese Patent Office on Jun. 23, 2014 in the corresponding Chinese patent application No. 2010800019188.
Chinese Office Action issued Nov. 15, 2014 in corresponding Chinese Patent Application No. 201080029610.4.
Extended European Search Report issued Nov. 4, 2014 in corresponding European Patent Application No. 09766515.2.
Chinese Office Action issued Dec. 3, 2014 in corresponding Chinese Patent Application No. 201210087070.6.
Japanese Office Action issued Jan. 20, 2015 in corresponding Japanese Patent Application No. 2011-510758.
Chinese Office Action issued Jan. 8, 2015 in corresponding Chinese Patent Application No. 201210086644.8.
Chinese Office Action issued Dec. 3, 2014 in corresponding Chinese Patent Application No. 201210549780.6.
Partial Translation of JP 57-3498A.
Japanese Office Action issued Feb. 17, 2015 in corresponding Japanese Patent Application No. 2014-098585.
Japanese Office Action issued Feb. 3, 2015 in corresponding Japanese Patent Application No. 2014-115496.
Chinese Office Action issued Feb. 2, 2015 in corresponding Chinese Patent Application No. 201210086679.1.
Summons to attend oral proceedings issued Feb. 9, 2015 in corresponding European Patent Application No. 10788219.3.
Office Action issued Apr. 28, 2015 in related U.S. Appl. No. 13/221,335.
Notice of Allowance issued by the Japanese Patent Office on Apr. 14, 2015 in corresponding Japanese Patent Application No. 2014-115496.
Korean Office Action issued Apr. 1, 2015 in corresponding Korean Patent Application No. 10-2010-7005223.
Chinese Office Action issued Mar. 9, 2015 in corresponding Chinese Patent Application No. 2010800001918.8.
Japanese Office Action issued Mar. 3, 2015 in corresponding Japanese Patent Application No. 2014-081176.
Office Action issued Apr. 1, 2015 in related U.S. Appl. No. 13/665,320.

(56) References Cited

OTHER PUBLICATIONS

Japanese Office Action issued Mar. 3, 2015 in corresponding Japanese Patent Application No. 2014-081167.
Restriction Requirement issued Oct. 2, 2012 in related U.S. Appl. No. 12/929,070.
Office Action issued Jan. 9, 2013 in related U.S. Appl. No. 12/929,070.
Office Action issued Jul. 10, 2013 in related U.S. Appl. No. 12/929,070.
Advisory Action issued Sep. 19, 2013 in related U.S. Appl. No. 12/929,070.
Office Action issued Sep. 24, 2014 in related U.S. Appl. No. 12/929,070.
Notice of Allowance issued Feb. 17, 2015 in related U.S. Appl. No. 12/929,070.
U.S. Appl. No. 12/285,323, filed Oct. 1, 2008, Akira Yasuda, Trigence Semiconductor, Inc.
U.S. Appl. No. 12/659,813, filed Mar. 22, 2010, Jun-ichi Okamura, Trigence Semiconductor, Inc.
U.S. Appl. No. 13/221,335, filed Aug. 30, 2011, Akira Yasuda, Trigence Semiconductor, Inc.
U.S. Appl. No. 12/929,070, filed Dec. 28, 2010, Akira Yasuda, Trigence Semiconductor, Inc.
Office Action issued Jun. 18, 2015 in related U.S. Appl. No. 13/763,083.
Notice of Allowance issued Jul. 16, 2015 in U.S. Appl. No. 13/221,335.
Notice of Allowance issued Jul. 23, 2015 in U.S. Appl. No. 13/665,320.
Office Action dated Dec. 1, 2015 regarding a Japanese Patent Application No. 2015-054483.
Office Action dated Sep. 14, 2015 regarding a corresponding Chinese Patent Application No. 201080001918.8.
Office Action dated Oct. 13, 2015 regarding a corresponding Korean Patent Application No. 10-2010-7005223.
Office Action dated Oct. 27, 2015 regarding a corresponding Japanese Patent Application No. 2014-211709.
The minutes of the oral proceedings of EP10788219.3 dated on Nov. 30, 2015, regarding the European counterpart of the current application.
The decision to refuse a European Patent Application of EP10788219.3 dated on Nov. 30, 2015, regarding the European counterpart of the current application.
Office Action issued on Dec. 4, 2015 by Korean Patent Office regarding the correspondina Korean patent application of No. 10-2010-7027958.
Office Action of U.S. Appl. No. 14/919,349 mailed on Jul. 7, 2016.
Japanese Office Action for Japanese Patent Application No. 2014-211709, mailed on May 31, 2016.
Chinese Office Action dated Feb. 2, 2016 for corresponding Chinese Patent Application No. 201310273303.6.
Japanese Office Action dated Feb. 9, 2016 for Japanese Patent Application No. 2015-088654, which is a corresponding application related this application.
Chinese Office Action dated Feb. 22, 2016 for Chinese Patent Application No. 201080001918.8, which is a related application to this application.
Extended European Search Report dated Mar. 21, 2016 for European Counterpart (EP16152775) of the Present Application.
Korean Intellectual Property Office Decision of Korean Patent Application No. 10-2010-7005223 mailed on Sep. 1, 2016 with partial translation.
Office Action mailed on Nov. 10, 2016 for corresponding U.S. Appl. No. 14/919,349.

* cited by examiner

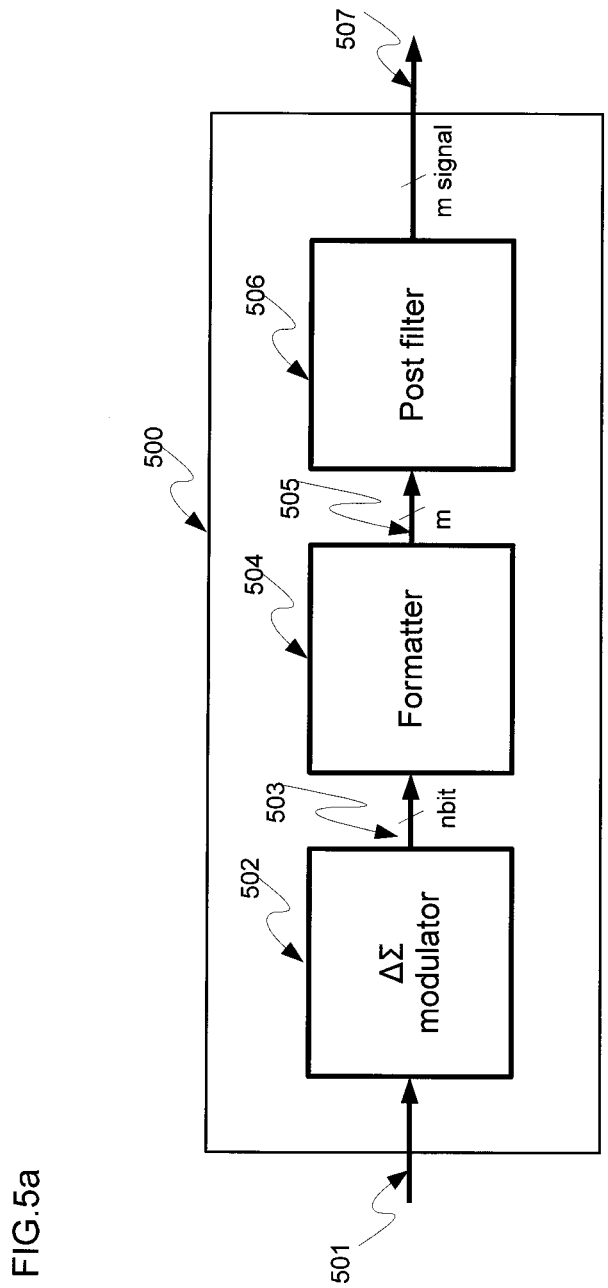

X-X' cross section

X-X' cross section

ACOUSTIC PLAYBACK SYSTEM

CROSS REFERENCE TO RELATED APPLICATIONS

This application is a continuation of U.S. application Ser. No. 12/929,070 filed Dec. 28, 2010, which is a continuation application, under 35 U.S.C. §111(a), of International application No. PCT/JP2010/069504, filed on Nov. 2, 2010, which claims priority to Japanese application No. 2009-284968, filed on Dec. 16, 2009, the disclosures of which are incorporated herein by reference.

BACKGROUND

Technical Field

The present invention relates to a digital acoustic playback system for direct conversion of a digital signal into analog audio, and in particular relates to a multi-way digital acoustic playback system and applications using the same.

Description of Related Art

WO2007/135928A1 discloses a digital/analog conversion apparatus which directly converts a digital signal into analog audio. In WO2007/135928A1, a system which directly converts a digital signal into analog audio by using a circuit which is supplied with a digital audio signal as an input and which outputs a plurality of digital signals and a plurality of coils (units) which are driven by the plurality of digital signals is disclosed. Below, this type of system is referred to as a digital acoustic playback system.

This type of digital acoustic playback system has a characteristic of lower power consumption compared to an analog acoustic playback system which drives a speaker using an analog electrical signal. In addition, because a plurality of speakers or a plurality of driving units (such as coils) are used, a large sound pressure with a low electrical voltage is possible compared to a conventional analog audio system which uses a single speaker or single driving unit.

An acoustic playback system configured with a combination of a plurality of speakers, each covering a different frequency range (a different frequency band) is known. This type of acoustic playback system is referred to as a multi-way acoustic playback system. In this type of acoustic playback system, speakers are driven by generating analog signals for different frequency bands, each of which drives a speaker, by a network circuit which uses an analog LCR filter. Therefore, in order to configure a multi-way acoustic playback system using a digital acoustic playback system, a digital sound signal is converted into an analog signal, and the analog signal is converted into analog signals of respective bandwidths through the network circuit, then the converted analog signals must be converted to the digital signals before being input to the digital acoustic playback system. As a result, the conventional multi-way acoustic playback system has the problem of possessing a complex configuration.

FIG. 1 shows a representative conventional example of a multi-way analog acoustic playback system which uses speaker devices (analog speakers) driven by an analog signal. An analog audio signal (101) is converted to analog driving signals (103) for driving speakers after being power-amplified by an analog amplifier (102) and being divided to a plurality of analog signals (105a~105n) corresponding to a plurality of frequency bands by a network circuit (104) comprised from an analog LRC filter circuit, and the plurality of analog signals are input to speakers (106a~106n) covering a plurality of different bandwidths. This type of system is a typical embodiment of a multi-way analog acoustic playback system which uses an analog amplifier and speakers covering a plurality of bands.

A different example of a conventional multi-way analog system which uses analog speakers is shown in FIG. 2. A digital audio signal (201) is divided to a plurality of digital signals (203a~203n) corresponding to a plurality of frequency bands by a digital filter (202). The plurality of digital signals corresponding to the plurality of frequency bands are converted to a plurality of analog signals (205a~205n) corresponding to the plurality of frequency bands by a plurality of digital analog converters (204a~204n). Then, a plurality of analog drive signals (207a~207n) which are power-amplified by a plurality of analog amplifiers (206a~206n) drive speakers (208a~208n) which cover the plurality of different bands. A disadvantage in this conventional example is that a digital analog device and amplifier are required for each of the speakers which cover the plurality of different bands. However, because it is possible to realize a filter by digital signal processing, such systems are used for high quality audio in order to realize various band characteristics. This type of system is a typical embodiment of a so-called by drive type multi-way analog acoustic playback system.

FIG. 3 shows an example of a multi-way digital acoustic playback system configured with a digital acoustic playback system comprised of a circuit which is supplied with a digital audio signal as an input and outputs a plurality of digital signals and a plurality of coils (units) driven by the plurality of digital signals. After a digital audio signal (301) is once converted to an analog signal (303) by a digital analog converter (302), it is divided into analog signals (305a~305n) corresponding to a plurality of frequency bands by a network circuit (304) comprised of an analog RLC filter circuit. Respective analog signals are converted again to respective digital signals (307a~307n) corresponding to a plurality of frequency bands by a plurality of analog digital converters (306a~306n). The digital signals are converted to a plurality of digital signals corresponding to the plurality of frequency bands by digital modulation circuits (308a~308n) which are supplied with digital audio signals as inputs and which output a plurality of digital signals and the converted plurality of digital signals are supplied as inputs to speakers (310a~310n) which have a plurality of coils which cover the plurality of different bands. When this type of multi-way acoustic playback system comprised of an analog circuit is simply combined with the digital acoustic playback system shown for example in WO2007/135928A1 in the way described above, a problem arises that the number of required components becomes large.

SUMMARY

As explained above, in the case of configuring a multi-way digital acoustic playback system which uses a digital acoustic playback system comprised of a plurality of coils driven by a plurality of digital signals generated from a digital audio signal, when an analog type multi-way configuration with a network circuit is used, there occurs a problem such that the number of required components becomes large. Because power is consumed by each component, the low power consumption characteristics of a digital acoustic playback system cannot be realized when the number of required components increases. However, in order to obtain high sound quality acoustic reproduction, an acoustic playback system is required in which a plurality of speakers suitable for the reproduction band characteristics of high sound quality are combined.

Generally, in a high sound quality acoustic playback system, it is necessary to configure an acoustic playback system which is suitable for the reproduction bands of different speakers. Even in an acoustic playback system which uses a digital acoustic playback system it is necessary to configure an acoustic playback system by combining a plurality of digital acoustic playback systems which are suitable for reproduction bands. However, until now there has been no proposal related to a specific configuration of an acoustic playback system, in particular a multi-way acoustic playback system, which uses a digital acoustic playback system, and it is difficult to configure an acoustic playback system which can achieve high sound quality acoustic reproduction while taking advantage of the low power consumption of a digital acoustic playback system.

As one embodiment of the present invention, an acoustic playback system comprising: a digital filter; and a plurality of digital modulators each of which outputs a digital signal to one of a plurality of speakers configured with speakers driven by digital signals having different play back bandwidths is provided. Such an acoustic playback system is characterized in that the digital filter converts a digital audio signal which is input to a plurality of digital audio signals of a plurality of frequency bandwidths corresponding to play back bandwidths of the plurality of speakers, and outputs each of the digital audio signals of the plurality of frequency bandwidths to one of the plurality of digital modulators; each of the plurality of digital modulators outputs the modulated digital signal to the speaker of a play back bandwidth corresponding to a frequency bandwidth of the digital audio signal which is input by performing miss match shaping after noise shaping to a digital audio signal which is input; and each number of bits of a digital signal which is output by each of the digital modulators is different.

As one embodiment of the present invention, an acoustic playback system comprising: a first digital filter; a second digital filter; a first digital modulator; a second digital modulator; and a third digital modulator is provided. Such an acoustic playback system is characterized in that the first digital filter converts a first digital audio signal which is input to a second digital audio signal which has a high frequency bandwidth and a third digital audio signal which has low frequency bandwidth; the second digital filter converts a fourth digital audio signal which is input to a fifth digital audio signal which has a high frequency bandwidth and a sixth digital audio signal which has a low frequency bandwidth; the first digital modulator outputs to a first speaker by performing miss match shaping after performing noise shaping to the second digital audio signal; the second digital modulator outputs to a second speaker by performing miss match shaping after performing noise shaping to the fifth digital audio signal; and the third digital modulator outputs to a third speaker by adding the third digital audio signal and the sixth digital audio signal and by performing miss match shaping after performing noise shaping.

As one embodiment of the present invention, an acoustic playback system comprising: a first digital filter; a second digital filter; a third digital filter; a first digital modulator; a second digital modulator; and a third digital modulator is provided. In such an acoustic playback system, the first digital filter converts a first digital audio signal which is input to a second digital audio signal which has a first band pass; the second digital filter converts a third digital audio signal which is input to a fourth digital audio signal which has a second band pass; the third digital filter extracts a fifth digital audio signal having a lower frequency bandwidth than the first band pass or the second band pass from a signal processed by adding the first digital audio signal and the second audio digital signal; the first digital modulator performs miss match shaping after performing noise shaping to the second digital audio signal and outputs to a first speaker; the second digital modulator performs miss match shaping after performing noise shaping to the fourth digital audio signal and outputs to a second speaker; and the third digital modulator performs miss match shaping after performing noise shaping to the fifth digital audio signal and outputs to a third speaker.

As one embodiment of the present invention, an acoustic playback system comprising: a $\Delta\Sigma$ modulation circuit which performs noise shaping to a digital audio signal which is input and outputs a digital signal; and a miss match shaping circuit which performs miss match shaping on a digital signal output by the $\Delta\Sigma$ modulation circuit and outputs each signal of bits which are a part of the digital signal having a plurality of bits to one of a plurality of speakers is provided.

As one embodiment of the present invention, an acoustic playback system comprising: a plurality of digital signal processing circuits each of which is supplied as an input with a digital audio signal and outputs a digital signal to one of a plurality of speakers; and a controller which controls parameters of each of the plurality of digital signal processing circuits is provided. In such an acoustic playback system, each of the plurality of digital signal processing circuits filters a digital signal of a certain frequency bandwidth from the digital audio signal which is input and performs noise shaping and miss match shaping; and the controller controls the parameters of one or more of a frequency bandwidth which is filtered by the plurality of digital signal processing circuits, a noise shaping oversampling rate, and a degree of miss match shaping.

As one embodiment of the present invention, an acoustic playback system comprising: a digital filter which is supplied with an input with a digital audio signal and outputs digital signals corresponding to plurality of frequency bandwidths; and a plurality of digital modulators each of which outputs a digital signal to one of a plurality of speakers having different play back sound pressures comprised from a speaker driven by a digital signal; wherein each number of bits of the digital signal output by each of the digital modulators is mutually different is provided.

As one embodiment of the present invention, a speaker system comprising: a digital modulator which performs miss match shaping after performing noise shaping to a digital audio signal which is input, and outputs a modulated digital signal having a plurality of bits; a speaker which has a plurality of coils supplied with a plurality of bit signals of the digital signal; wherein the plurality of coils supplied with each bit signal form one layer around an axis and are wound overlapping together in a perpendicular direction to the direction of the axis is provided.

As one embodiment of the present invention, an speaker system comprising: a digital modulator which performs miss match shaping after performing noise shaping to a digital audio signal which is input, and outputs a modulated digital signal having a plurality of bits; and a speaker which has a plurality of coils supplied with a plurality of bits signal of the digital signal; wherein the plurality of coils form a plurality of layers around a coil axis, and on adjacent layers except the coils at both ends of a layer the position of each coil is shifted one space is provided.

As one embodiment of the present invention, an acoustic playback system comprising: a first digital modulator which is supplied with a first digital audio signal and outputs a first digital signal to each of a plurality of speakers, each of the plurality of speakers output by synthesizing a plurality of digital signals which are input; a second digital modulator which is supplied with a second digital audio signal and outputs a second digital signal to each of the plurality of speakers; wherein each of the first and second digital modulators performs mismatch shaping after performing noise shaping on the digital audio signal which is input and outputs a digital signal which is modulated is provided.

According to the present invention, it is possible to configure without increasing constituent elements of an acoustic playback system using an digital acoustic playback system including a plurality of coils driven by a plurality of digital signals generated from a digital audio signal.

BRIEF EXPLANATION OF DRAWINGS

FIG. 5a is a structural diagram of the internal circuitry of a digital modulation circuit which is used in a by drive multi-way analog acoustic playback system which uses a digital filter circuit.

DESCRIPTION OF EMBODIMENTS

The present invention is explained below as a number of embodiments while referring to the diagrams. Furthermore, the present invention is not limited to these embodiments and can be carried out with various changes without departing from the scope and spirit of the invention.

Figure 3:
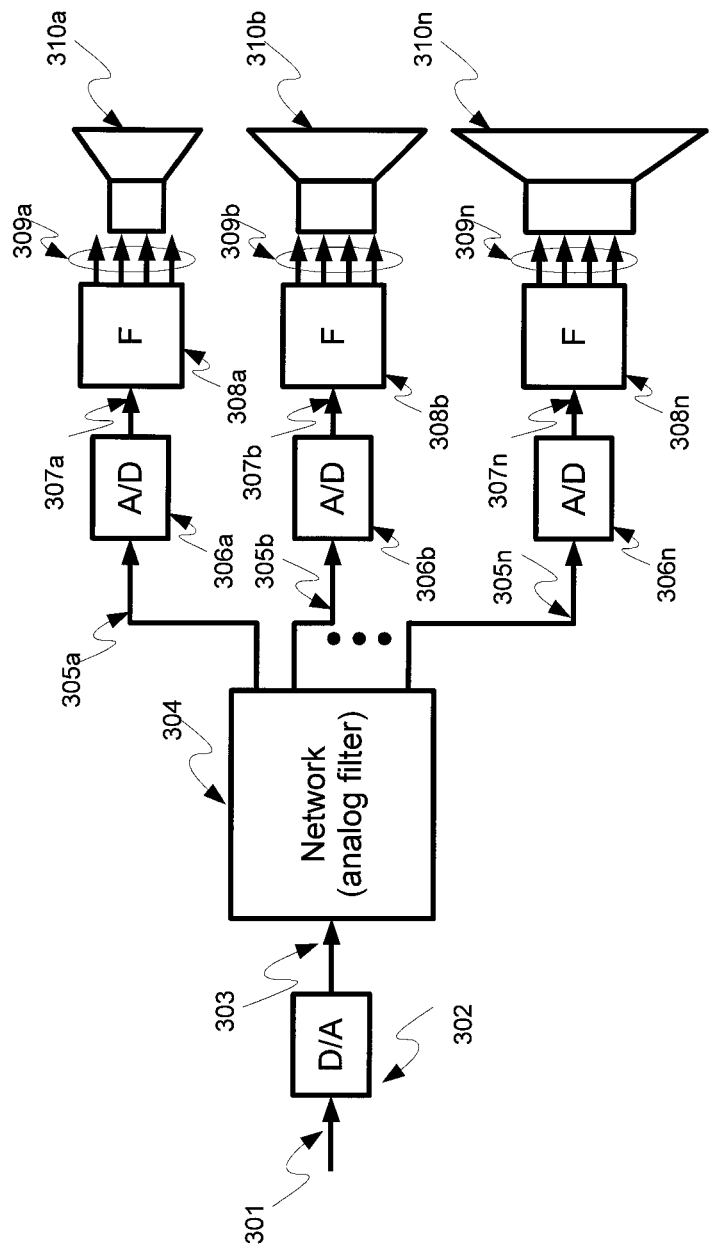
FIG. 3 is a structural diagram of a multi-way analog acoustic playback system in which a network circuit of an analog RLC filter and a digital acoustic playback system are combined.

As a proposal for solving the aforementioned problems which occur with the analog and digital combination as shown in FIG. 3, audio may be reproduced with the most suitable digital acoustic playback system by dividing signals into a high pass digital signal and a low pass digital signal using a digital filter signal process block and by arranging digital analog converters at each frequency band in parallel as a plurality of channels in order to reproduce each signal.

Figure 1:
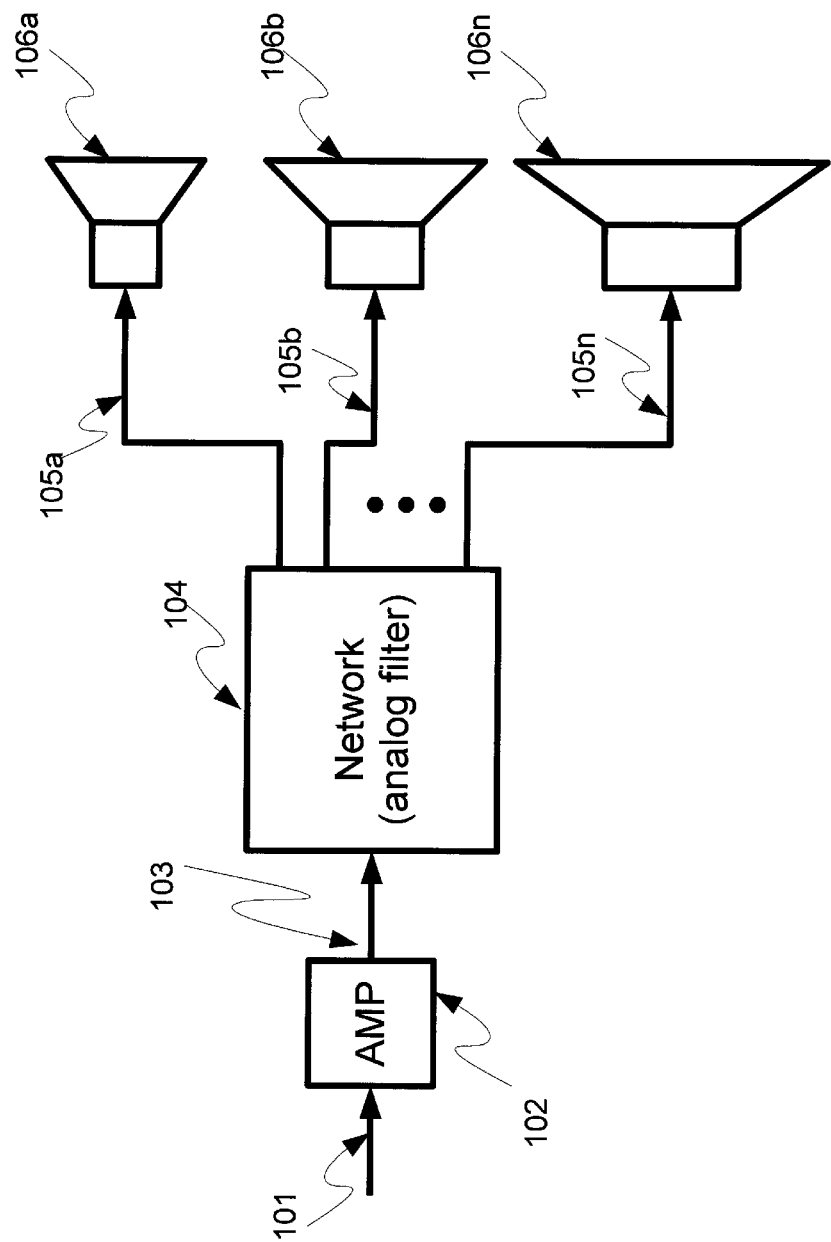
FIG. 1 is a structural diagram of a multi-way analog acoustic playback system which uses a network circuit of an analog RLC filter.
Figure 2:
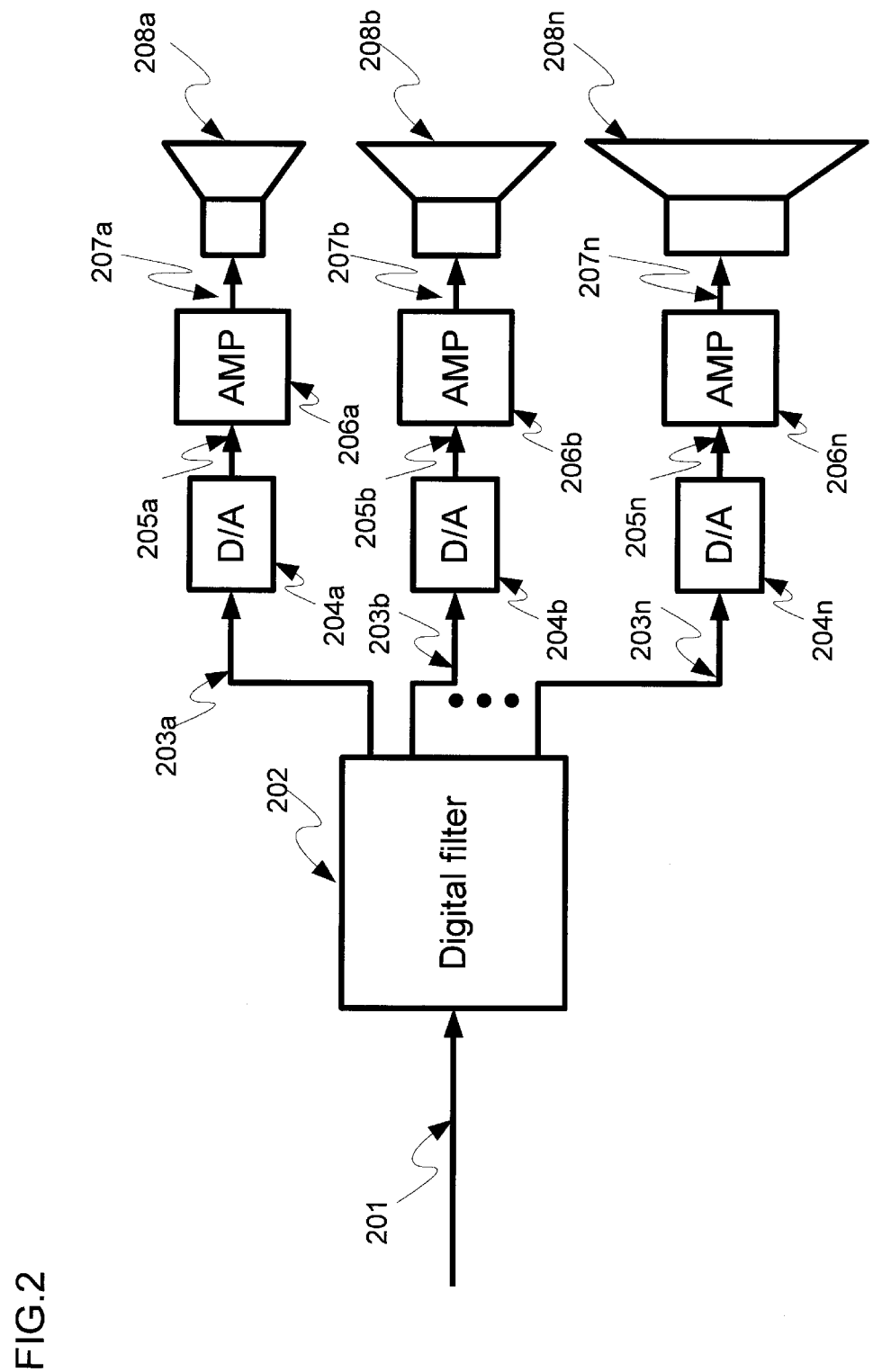
FIG. 2 is a structural diagram of a by drive multi-way analog acoustic playback system which uses a digital filter circuit.
Figure 4:
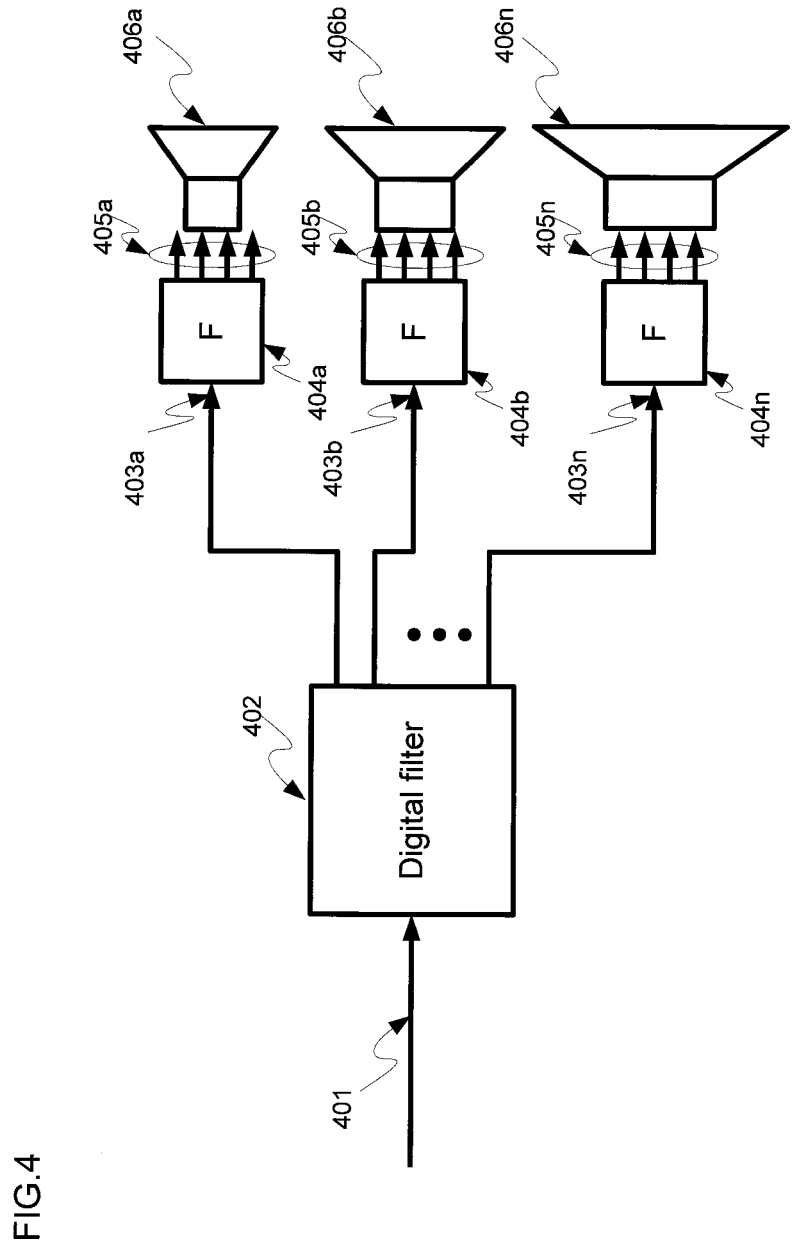
FIG. 4 is a structural diagram of a by drive multi-way analog acoustic playback system which uses a digital filter circuit.

FIG. 4 shows a structural diagram of a first embodiment of a by drive acoustic playback system which uses such a digital acoustic playback system. A digital audio signal (401) is divided into a plurality of digital signals (403a~403n) corresponding to a plurality of frequency bands by a digital filter (402). The plurality of digital signals corresponding to the plurality of frequency bands are converted to digital signals (405a~405n) corresponding to the plurality of frequency bands by digital modulation circuits (404a~404n) which are supplied with the digital audio signal as an input and which output the plurality of digital signals, and drive speakers (406a~406n) having multi coils (units), each speaker covering one of a plurality of different bands. The configuration of the digital acoustic playback system shown in FIG. 4 is similar to the multi-way analog acoustic playback system shown in FIG. 1. However, the number of constituent elements of the acoustic playback system shown in FIG. 4 is smaller than the number of constituent elements of the multi-way analog acoustic playback system shown in FIG. 2.

Furthermore, in FIG. 4, each of the digital conversion circuits (404a~404n) which are supplied with the digital audio signal as an input and which output the plurality of digital signals may be configured with the same circuit. In this configuration, each of the plurality of digital signals (405a~405n) may have the same number of bits. However, as stated below, it may become difficult to reduce power consumption because digital signals with a different number of bits corresponding to frequency bands reproduced by speakers etc. are not output.

FIG. 5a shows an example of the structure of one of the digital modulation circuits (404a~404n) which are supplied with a digital audio signal as an input and which output a plurality of digital signals. A digital audio signal (501) is converted to a digital signal (503) of n bits by a multi-bit $\Delta\Sigma$ modulator (502). After the digital signal of n bits is converted to m thermometer codes (505) by a formatter (504), a digital driving signal (507) to drive the plurality of coils (units) is converted by a post filter (506). The post filter removes noise by a miss match shaping method, the noise being caused by manufacturing variation among the plurality of coils (units), which becomes a problem when driving the plurality of coils (units).

Figure 5B:
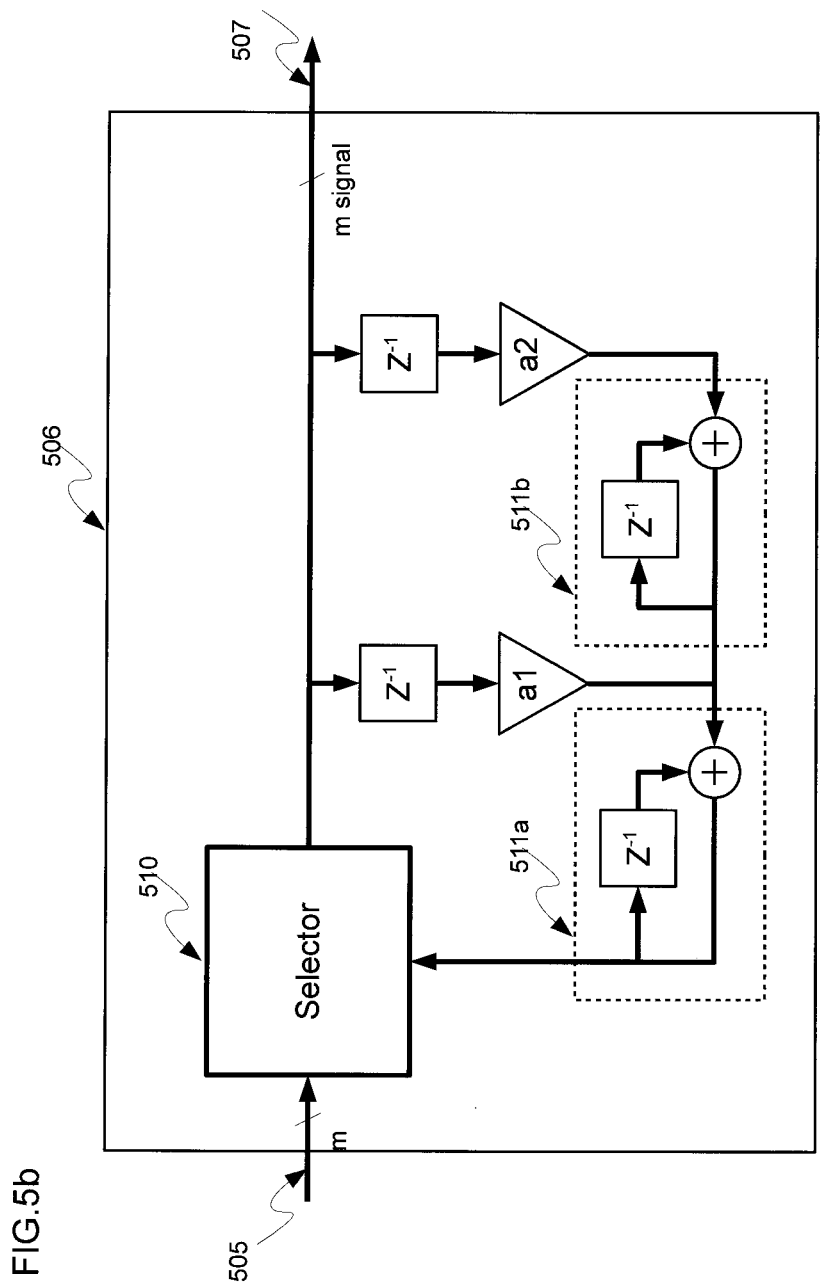
FIG. 5b is a functional block diagram of a post filter used in the internal circuitry of a digital modulation circuit.

FIG. 5b shows an example of the structure of a post filter (506) used for a digital modulation circuit. The m thermometer codes (505) are supplied as an input to a selection circuit (510) in order to remove noise by a miss match shaping method, the noise being caused by manufacturing variation among the plurality of coils (units). The selection circuit (510) operates by selecting one of the output signals (507) in order of usage frequency so that the signal of the lowest usage frequency is selected based on the calculation of the usage frequency of each output signal (507) by at least two or more integrator circuits (511a, 511b), each circuit comprising a delay element and an adder.

Figure 6:
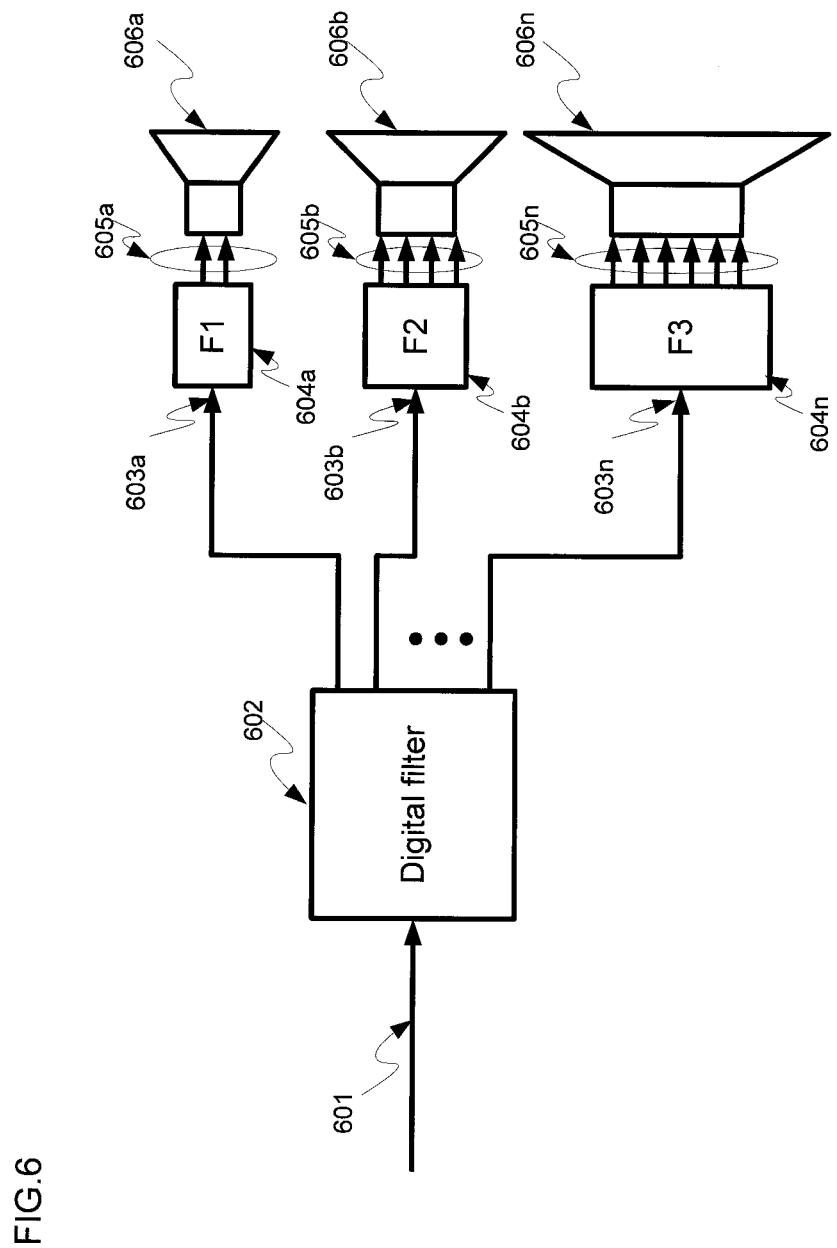
FIG. 6 is a structural diagram of an acoustic playback system related to one embodiment of the present invention.

FIG. 6 shows a structural diagram of a second embodiment of the present invention related to an acoustic playback system comprised of a plurality of coils driven by a plurality of digital signals. The digital audio signal (601) is divided into a plurality of digital signals (603a~603n) corresponding to a plurality of frequency bands by a digital filter (602). The plurality of digital signals corresponding to the plurality of frequency bands are converted to a plurality of digital signals (605a~605n) corresponding to a plurality of frequency bands by different digital modulation circuits (604a~604n) which are supplied as inputs with a digital audio signal and which output the plurality of digital signals, and drive speakers (606a~606n) having multi-coils (units) and each of which covers each band. Here, the numbers of bits of the digital signals (605a~605n) are each different and the speakers (606a~606n) having multi-coils (units) are driven by the digital signals (605a~605n) having different numbers of bits according to the band covered by each of the speakers.

The second embodiment of the present invention shown in FIG. 6 is configured by different digital modulation circuits (604a~604n) each of which is supplied as an input with a digital audio signal and outputs a plurality of digital signals. By adopting this configuration, it becomes possible to generate digital signals with the most suitable number of bits for each band. In this way, it is possible to configure an acoustic playback system in which high quality acoustic reproduction is possible while taking advantage of low power consumption characteristics of a digital acoustic playback system. Below, the effects of the embodiments of the present invention are explained.

As is shown in FIG. 5a, the digital modulation circuit which is supplied as an input with a digital audio signal and outputs a plurality of digital signals is configured with a multi-bit $\Delta\Sigma$ modulator (502), a formatter (504), and a post filter (506). Here, quantization noise is generated when the digital signals which are supplied as an input are recombined into digital signals with a desired number of bits through the formatter. The multi-bit $\Delta\Sigma$ modulator provides a function for shifting the quantization noise to frequencies above an audible range by a noise shaping method. In order to shift the quantization noise to a high frequency using the multi-bit $\Delta\Sigma$ modulator it is necessary to oversample at a frequency higher than a sampling frequency of an audio digital signal.

Shifting quantization noise generated during a reproduction of a digital signal to a frequency bandwidth higher than an audible range by using a noise shaping method by a digital modulation using a multi-bit $\Delta\Sigma$ modulator and oversampling is disclosed, for example, in "Over sampling Delta-Sigma Data Converters" IEEE Press 1991 ISBN 0-87942-285-8. A relationship of the strength of noise-shaped noise with respect to an oversampling ratio and a degree of a modulator is shown in the formula (22) on pp. 7 of the above identified document. In general, by the oversampling method, the actual strength of the quantization noise in the case where L is the degree of a $\Delta\Sigma$ modulator decreases by 3(2L+1) dB every time the oversampling ratio doubles. Therefore, in order to reduce the quantization noise, either the oversampling ratio must be increased or the degree of the $\Delta\Sigma$ modulator must be increased.

Reversely, if the upper limit of the required audible range is allowed to be low, it is possible to relax the requirement to the degree of the modulator and/or the oversampling frequency for noise shaping by digital modulation in which a $\Delta\Sigma$ modulator and an oversampling are used. In the case of a digital acoustic playback system for low pass reproduction, it is possible to attenuate high pass audio data above, for example, 500 Hz in a digital audio signal by a digital filter. Because the audible frequencies originally included in a digital audio signal are 20 KHz or less in the case of compact disc quality for example, in a digital acoustic playback system for low pass reproduction it is sufficient to be able to reproduce information of frequency data lower by 500 Hz/20 KHz=1/40. In other words, even if the required oversampling ratio is sufficiently lowered, it is possible to obtain sufficient SNR up until 500 Hz. Quantization noise in this case is also distributed to an audible frequency region above 500 Hz. However, when a speaker for low pass reproduction itself cannot recombine the audio in this band, then the quantization noise is not reproduced.

In this way, it is possible to sufficiently reduce a required oversampling ratio in a digital acoustic playback system for low pass reproduction. Because power consumption of a digital circuit is proportional to an operational frequency, if the oversampling ratio is halved, the required power consumption for signal processing in a digital acoustic playback system is also halved.

Alternatively, it is also possible to reduce the degree of a modulator without changing an oversampling ratio. It is possible to reduce the scale of a required circuit by reducing the degree of a multi-bit ΔΣ modulator required for a digital acoustic playback system for low pass reproduction. Because power consumption of a digital circuit is proportional to the scale of the circuit, if the scale of the required digital circuit is reduced, the required power consumption for data processing in a digital acoustic playback system is also reduced, noise shaping characteristics are relaxed and high pass noise is reduced.

Similarly, by using a band pass type ΔΣ modulator in a digital acoustic playback system for midrange and high pass reproduction, it is possible to shift the quantization noise component to a frequency other than a mid range and a high pass. A band pass type ΔΣ modulation circuit is disclosed, for example, in "Understanding Delta-Sigma Data Converters" IEEE Press 2005 ISBN 0-471-46585-2. A method for shifting an NTF (Noise Transfer Function) of a ΔΣ modulator to an arbitrary frequency is shown in chapter 5 of this document. It is possible to reduce the scale of a required circuit by designing a digital acoustic playback system using a band pass typeΔΣ modulation circuit which is suitable for the band frequency of a mid range high pass reproduction speaker (a tweeter).

As stated above, low power consumption can be realized in a digital acoustic playback system dedicated for low pass reproduction or high pass reproduction compared to a digital acoustic playback system which covers all audible frequency regions. In other words, by configuring the digital acoustic playback system with different modulation circuits so that a digital audio signal is supplied as an input and a plurality of digital signals are output, it is possible to further optimize the power consumption characteristics of the digital acoustic playback system as in the second embodiment of the present invention shown in FIG. 6.

Figure 7:
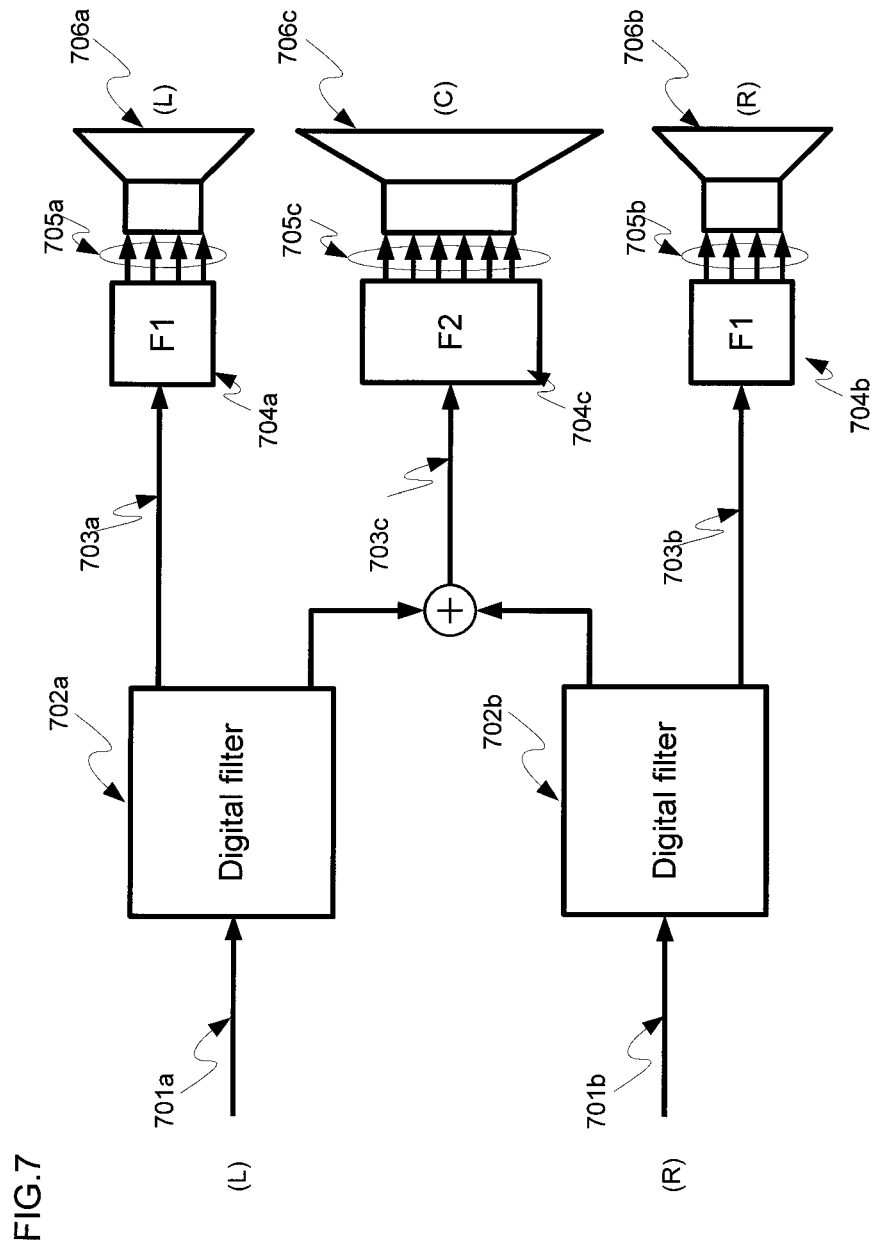
FIG. 7 is a structural diagram of an acoustic playback system related to one embodiment of the present invention.

FIG. 7 shows a third embodiment of the acoustic playback system comprised of a plurality of coils driven by a plurality of digital signals. Stereo digital audio signals (701a, 701b) are distributed to a plurality of digital signals corresponding to low pass and mid range pass frequency bands by digital filters (702a, 702b) dedicated to L and R. The low pass digital signals output from the digital filters (702a, 702b) are converted to a plurality of digital signals (705c) by a digital modulation circuit (704c) which is supplied as an input with a low pass digital audio signal (703c) after the addition process of L and R and outputs a plurality of digital signals, and then drives a speaker (706c) having multi coils (units) which covers a low bandwidth. Alternatively, mid range and high pass digital signals (703a, 703b) output from the digital filters for L and R are independently converted to a plurality of digital signals (705a, 705b) by digital modulation circuits (704a, 704b) each of which is supplied as an input with a digital audio signal and output a plurality of digital signals, and drive speakers (706a, 706b) having multi coils (units) which cover mid range and high bands. Generally because L and R of stereo reproduction contain similar low pass audio signals, no particular sound reproduction problems arise even when the signals of L and R are added together with respect to a low pass signal. By adopting the configuration shown in FIG. 7, because it is possible to combine L and R in a digital acoustic playback system covering low pass, the low power consumption characteristics of the acoustic playback system can be further optimized. The effects in a stereo method of a two way digital acoustic playback system are described in the present embodiment. However, the present embodiment can be appropriately applied to an arbitrary acoustic playback system other than the two way (stereo) reproduction. The present embodiment can also be applied to arbitrary digital acoustic playback systems which are supplied as an input with an arbitrary number of audio data other than two channels (stereo).

Figure 8A:
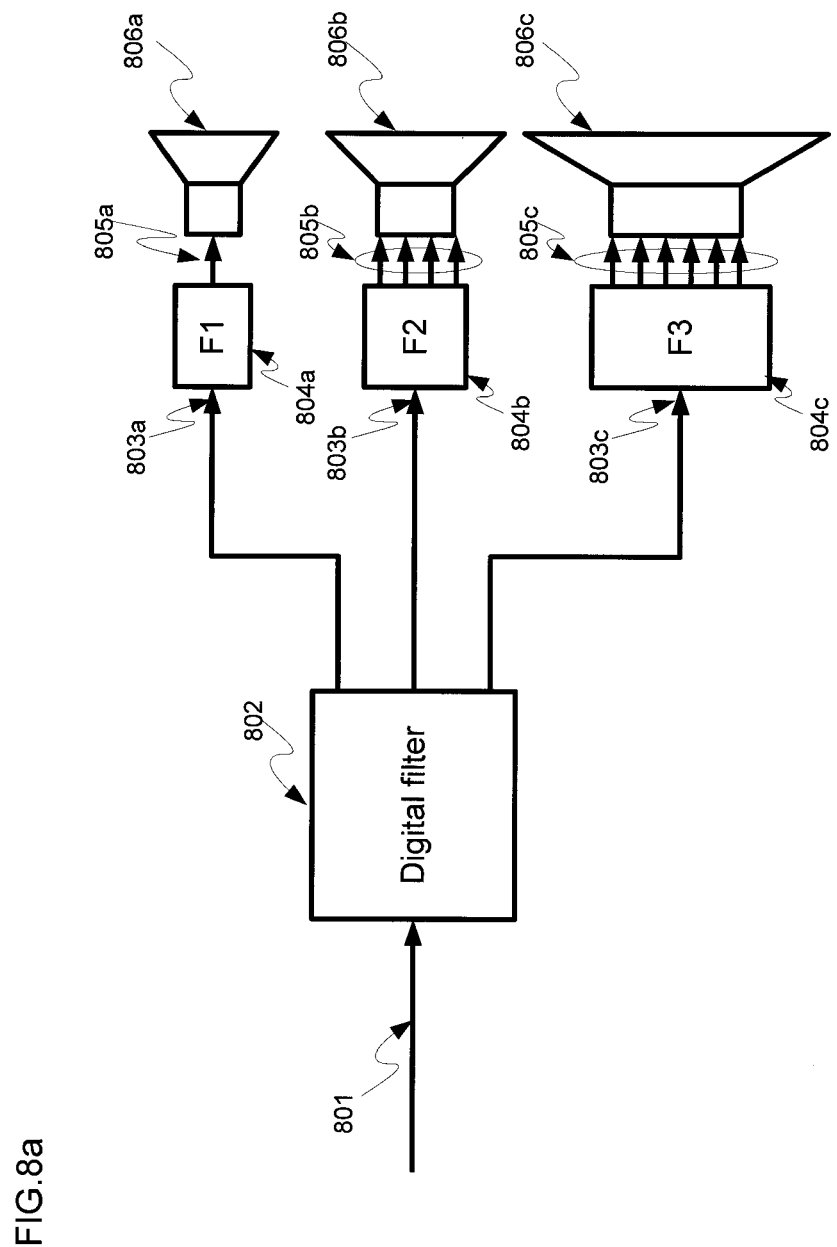
FIG. 8a is a structural diagram of an acoustic playback system related to one embodiment of the present invention.

FIG. 8a shows a fourth embodiment of an acoustic playback system comprised of multi coils driven by a plurality of digital signals. A digital audio signal is divided into three types of digital signals (803a, 803b, 803c) corresponding to three types of low pass, mid range, and high pass frequency bands by a digital filter (802). The plurality of digital signals corresponding to the three types of frequency bands are converted to a plurality of digital signals (805a, 805b, 805c) corresponding to a plurality of frequency bands by different digital modulation circuits (804a, 804b, 804c) each of which is supplied as an input with a digital audio signal and outputs a plurality of digital signals, and drive speakers (806a, 806b, 806c) having multi coils (units) and covering a plurality of different bands. Here, each of the digital signals (805a, 805b, 805c) has a different number of bits, and the speakers (806a, 806b, 806c) having multi coils (units) are driven by digital signals (805a, 805b, 805c) each of which has a different number of bits according to the band covered. The speaker (806a) which covers a high band is generally more efficient compared to the speakers (806b, 806c) which cover low and middle range bands, and a low level of power is required for driving the speaker. In other words, it is possible to reduce the number of bits of a driving digital signal. Furthermore, if the number of bits of a driving digital signal is 1, it is possible to further reduce power consumption of a digital acoustic playback system which covers a high band.

As is shown in FIG. 5a, a digital modulation circuit which is supplied as an input with a digital audio signal and outputs a plurality of digital signals is comprised of a multi-bit ΔΣ modulator, a formatter, and a post filter. Here, the post filter removes, by a miss match shaping method, noise caused by manufacturing variation among the multi coils (units), which becomes a problem when driving the multi coils (units). If a speaker which covers a high band is driven by a one bit digital signal, then the formatter and post filter are no longer required. Therefore, it is possible to significantly reduce the circuits required in a digital modulation circuit which is supplied as an input with a digital audio signal and outputs a plurality of digital signals. In other words, it is possible to further optimize the power consumption characteristics of the acoustic playback system. In the present embodiment, the effects of a three way digital acoustic playback system are described above. However, the present embodiment can also be applied to an arbitrary acoustic playback system other than a three way system.

Figure 8B:
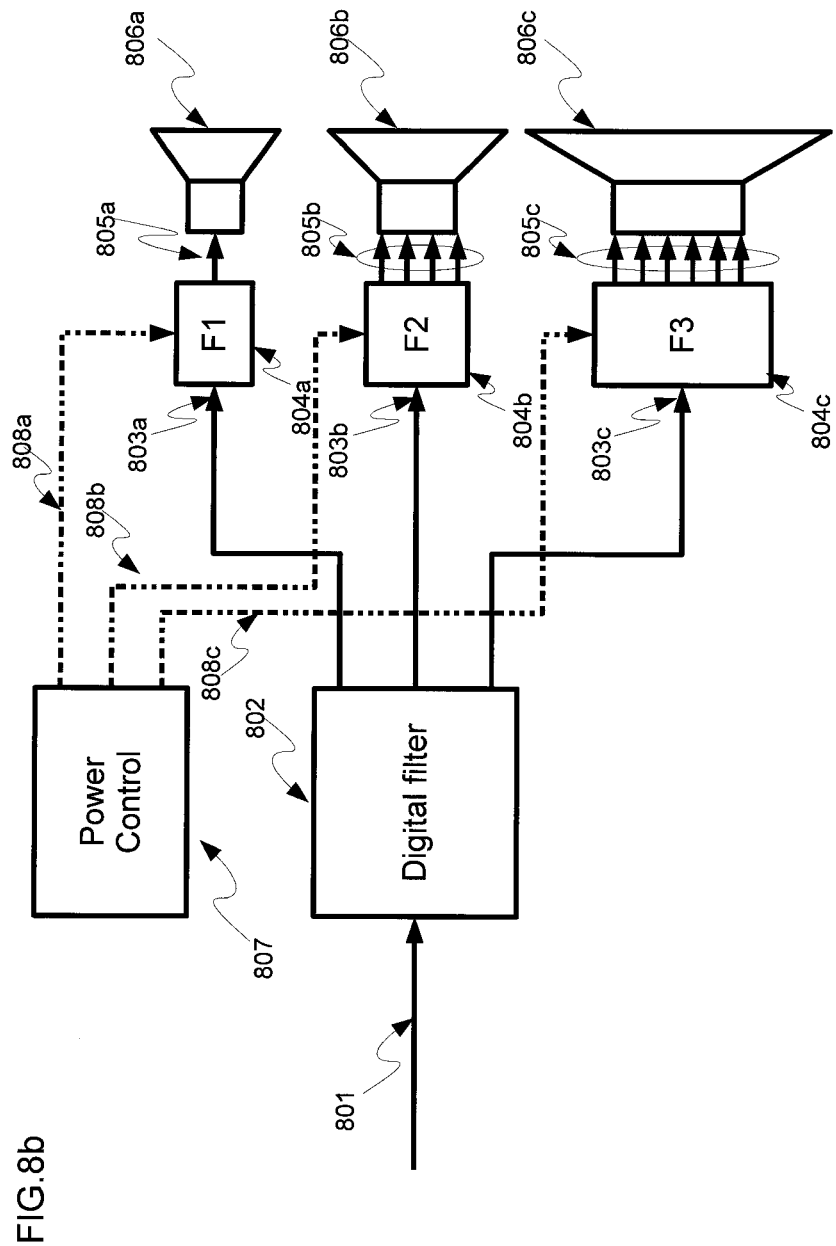
FIG. 8b is a structural diagram of an acoustic playback system related to one embodiment of the present invention.

FIG. 8b shows a fifth embodiment of an acoustic playback system comprised of a plurality of coils driven by a plurality of digital signals. In the present embodiment, a power supply control circuit (807) and power (808a, 808b, 808c) supplied to digital modulation circuits from the control circuit are added to the fourth embodiment shown in FIG. 8a. In the present embodiment it is possible to change the power supply voltage of each of the digital modulation circuits. In other words, it is possible to drive speakers having multi coils (units) by digital signals having different voltages corresponding to a plurality of frequency bands. Generally, because the efficiency of a speaker is different depending on the reproduction band, the difference in efficiency between individual speakers in an acoustic playback system can be supplemented by controlling an amplitude voltage of the digital signal which drives the speakers.

Figure 9A:
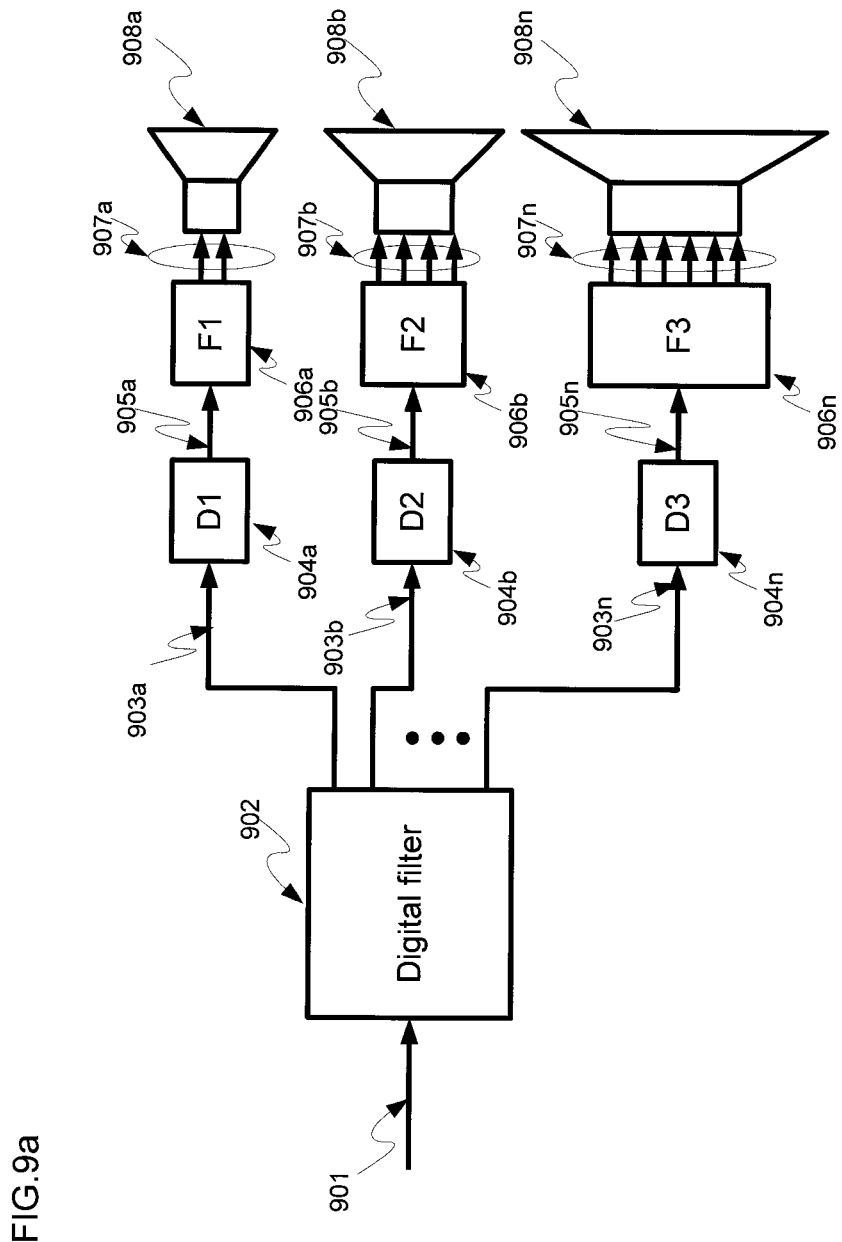
FIG. 9a is a structural diagram of an acoustic playback system related to one embodiment of the present invention.

FIG. 9a shows a sixth embodiment of an acoustic playback system comprised of a plurality of coils driven by a plurality of digital signals. A digital audio signal (901) is divided into a plurality of digital signals (903a~903n) corresponding to a plurality of frequency bands. The plurality of digital signals corresponding to the plurality of frequency bands are delayed according to the frequency bands by digital delay circuits (904a~904n). A plurality of digital signals (905a~905n) corresponding to the plurality of frequency bands from the digital delay circuits are converted to a plurality of digital signals (907a~907n) corresponding to the plurality of frequency bands by different digital modulation circuits (906a~906n) each of which is supplied as an input with a digital audio signal and outputs a plurality of digital signals, and drive speakers (908a to 908n) having multi coils (units) which cover a plurality of different bands.

In an actual application, it may be the case that the physical arrangement position of speakers which include multi coils (units) and cover a plurality of bandwidths is separated. For example, in the case where an acoustic playback system is constructed within a car, a speaker which covers a low and middle pass is arranged at the lower part of a door and a speaker which covers a high pass is arranged at the upper part of a door near the driver's seat. Generally, because there is poor localization information in a low band and rich localization information in a high band, by placing a speaker which covers a high band in position close to the head, it becomes possible to reproduce an acoustic range with an excellent sense of stereo. However, when the physical distance from a speaker which covers a low band up to the head part and the physical distance from a speaker which covers a high band up to the head part is different, audio is reproduced unnaturally because there is a time difference in the reproduced sound from each speaker. As in a sixth embodiment shown in FIG. 9a, by inserting a digitally adjustable digital delay circuit for each of the corresponding bands, it becomes possible to adjust the arrival time difference of the play back audio up to the head part without depending on the position of the speakers which comprise the acoustic playback system. Because the delay circuit can be realized by a digital delay circuit, the scale of the circuit is small and power consumption is low compared to a delay circuit made of an analog circuit. Therefore, even if a digital delay circuit is inserted as in the present embodiment, there is little loss in the low power consumption characteristics of the acoustic playback system.

Figure 9B:
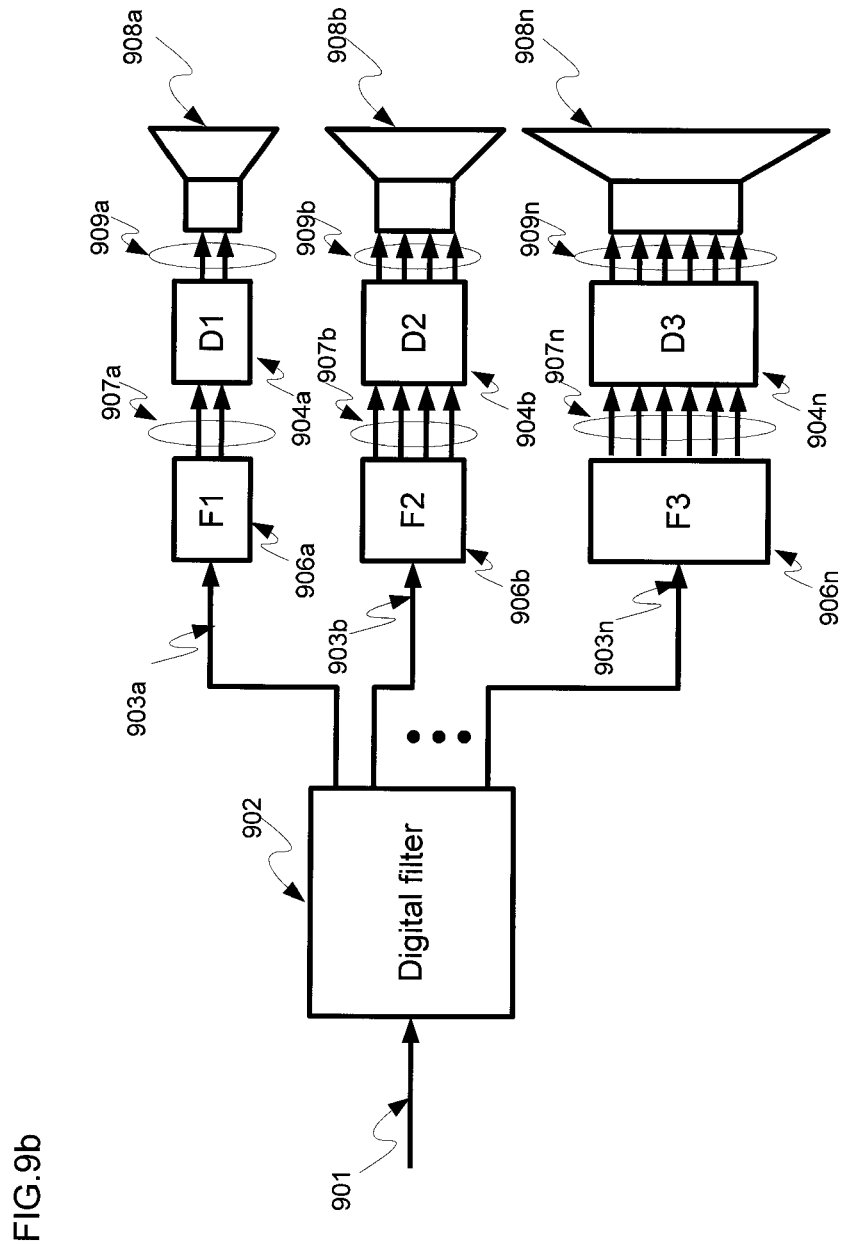
FIG. 9b is a structural diagram of an acoustic playback system related to one embodiment of the present invention.

FIG. 9b shows a seventh embodiment of an acoustic playback system comprised of a plurality of coils driven by a plurality of digital signals. In the present embodiment, digital delay circuits (904a~904n) are arranged between digital modulation circuits each of which is supplied with a digital signal as an input and outputs a plurality of digital signals and speakers having multi coils (units) and covering a plurality of different bands, and speakers (908a~908n) having multi coils (units) and covering the plurality of different bands are driven by signals (909a~909n) which are signals obtained by delaying a plurality of digital signals (907a~907n) corresponding to the plurality of frequency bands from the different digital modulation circuits (908a~908n) each of which is supplied with a digital audio signal as an input and outputs a plurality of digital signals. Because it is possible to realize the delay circuits with 1 bit digital delay circuits, the scale of the circuit is small and power consumption is low compared to a delay circuit made of an analog circuit. By adjusting the delay, in addition to obtaining the same effects as the sixth embodiment, by controlling the delay of each of the plurality of digital signals corresponding to the plurality of frequency bands, it is possible to realize delay control as a digital filter. For example, it is possible to form an FIR filter by gradually delaying the delay of the plurality of digital signals input to speakers having multi coils (units) by delay circuits. In this way, it is possible to reduce the generation of noise in a speaker.

Figure 10:
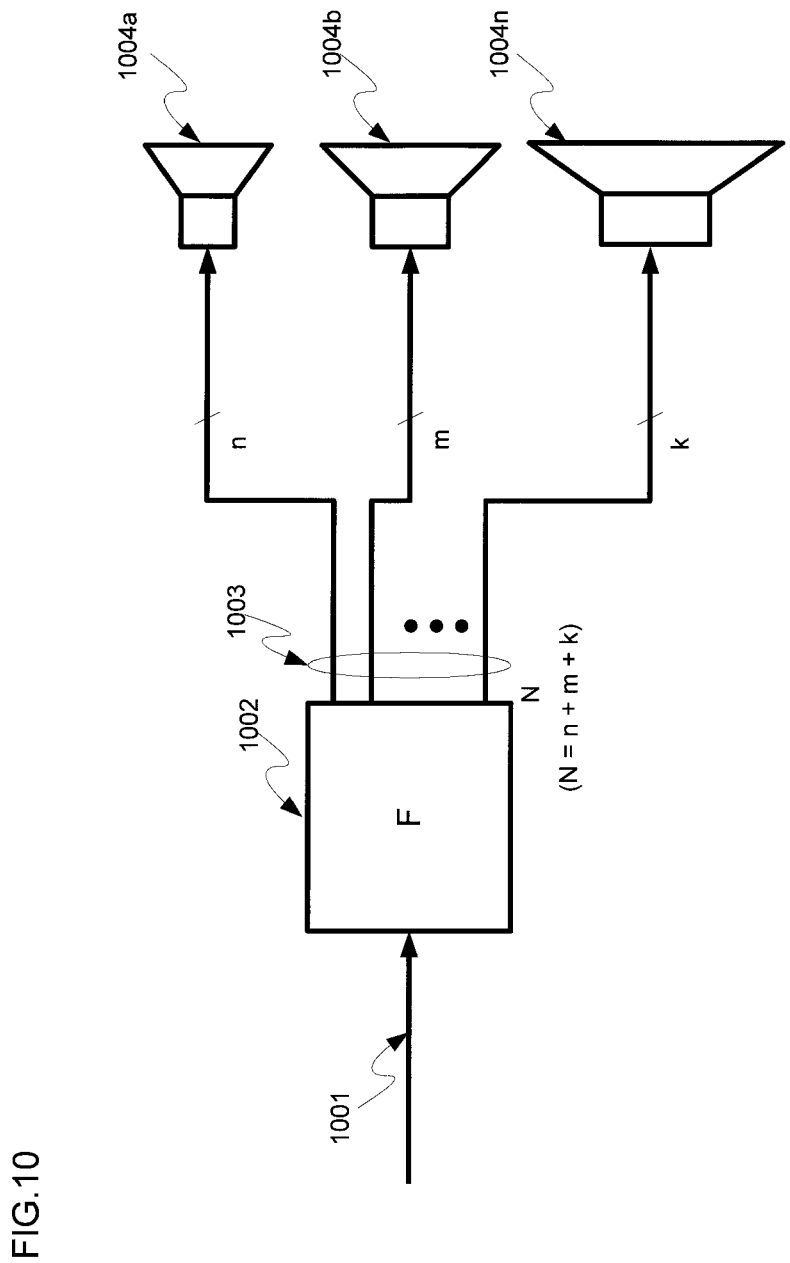
FIG. 10 is a structural diagram of an acoustic playback system related to one embodiment of the present invention.

FIG. 10 shows an eighth embodiment of an acoustic playback system comprised of a plurality of coils driven by a plurality of digital signals. A digital audio signal (1001) is converted to digital signals of N bits (1003) by a digital modulation circuit (1002) which is supplied with the digital audio signal as an input and outputs a plurality of digital signals. A plurality of digital signals (1003) are divided according to a required sound pressure and drive speakers (1004a~1004n) having multi coils (units) covering a plurality of different bandwidths.

In the present embodiment, it is not necessary to divide a digital audio signal into a plurality of digital signals corresponding to a plurality of frequency bands by a digital filter. The digital signals of N bits output from the digital modulation circuit which is comprised of a multi-bit $\Delta\Sigma$ modulator, a formatter and a post filter, as is shown in FIG. 5a, are distributed (where, N=n+m+k) to speakers having multi coils (units) covering different bands and drive the speakers. The digital acoustic playback system is structured by driving the speakers in this way. Audio signal data of the entire audible frequency region is included in the output of the digital modulation circuit which is supplied as an input with a digital audio signal and output a plurality of digital signals. However, it is possible to structure a simple digital acoustic playback system by using the fact that only a band corresponding to a speaker having multi coils covering the band can be reproduced.

In the present embodiment, it is possible to adjust the number of bits of a digital signal according to the sound pressure characteristics of a speaker having multi coils (units). In this way, it is possible to drive a plurality of speakers covering different bands in parallel by analog signals without using a network circuit. In addition, it is possible to obtain better capabilities than a simple analog multi way acoustic playback system. Furthermore, by configuring an acoustic playback system by inserting the digital delays circuit as in the fifth embodiment of the present invention before speakers having multi coils (units), it is possible to solve the problem of the arrival time difference to the head part of the reproduced audio related to the speaker arrangement.

Figure 11:
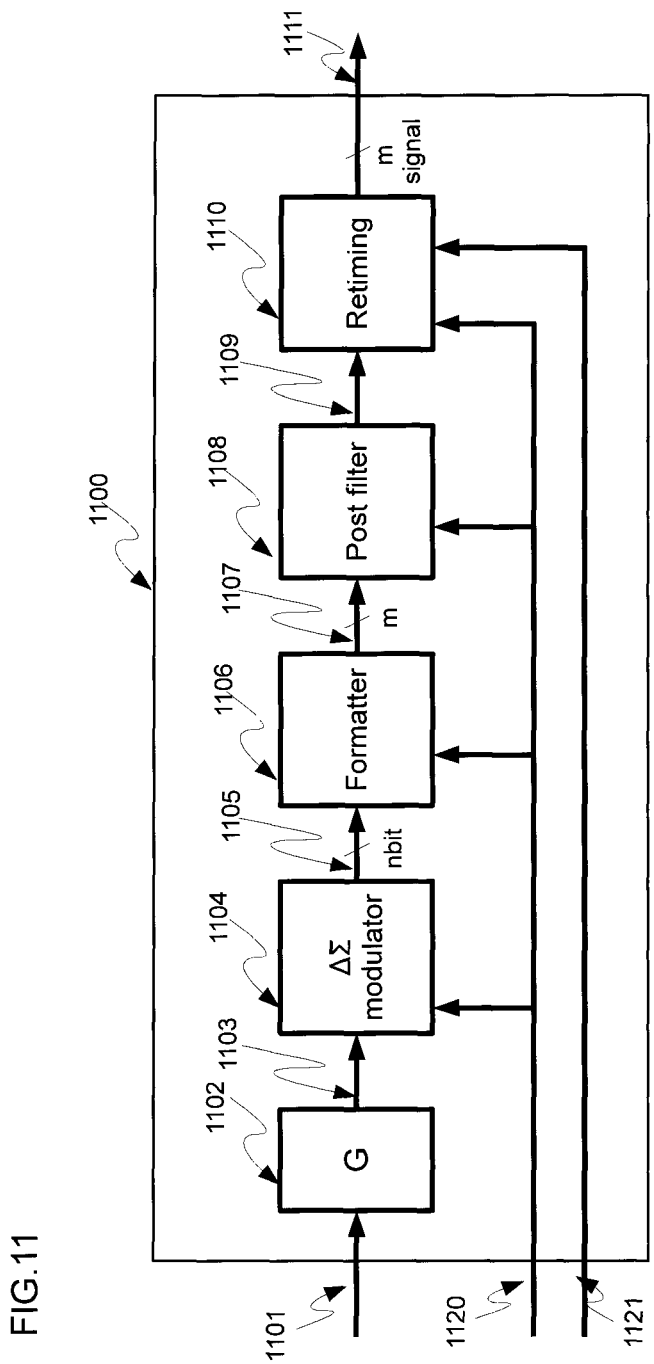
FIG. 11 is a structural diagram of the internal circuitry of a digital modulation circuit related to one embodiment of the present invention.

FIG. 11 shows one embodiment of a digital modulation circuit which is supplied as an input with a digital audio signal and outputs a plurality of digital signals. After a digital audio signal (1101) is converted to a digital signal which is adjusted to the efficiency of a speaker by a digital gain circuit (1102), the digital signal is then converted to an n bit digital signal (1105) by a multi-bit $\Delta\Sigma$ modulator (1104). The n bit digital signal is converted to m digital signals (1109) by a post filter after being converted to m thermometer codes (1107) by a formatter (1106). Following this, time data is accurately synchronized bit by bit by a re-timing circuit (1110) and the m digital signals are converted to digital driving signals (1111) which drive m coils (units). Here, each circuit is controlled by a clock signal (1120) and the re-timing circuit is controlled by a clock signal (1120) and a re-timing clock signal (1121). The post filter removes, by a mismatch shaping method, noise, which becomes a problem when the plurality of coils (units) are driven, caused by manufacturing variations among the plurality of coils. In addition, because the re-timing circuit accurately synchronizes time data bit by bit, noise generated at the time of digital drive is reduced.

Figure 12:
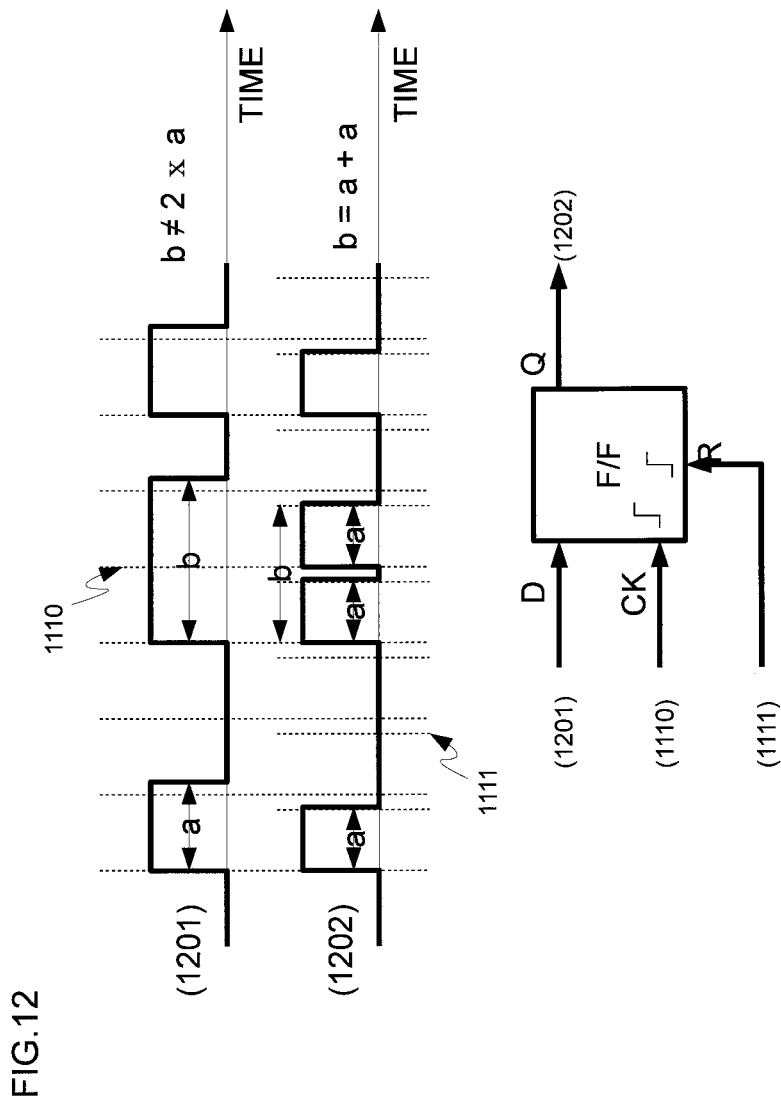
FIG. 12 is a diagram of an operation waveform and circuit structure of a re-timing circuit used in a digital modulation circuit related to one embodiment of the present invention.

FIG. 12 shows an operation wave shape of a re-timing circuit used in the digital modulation circuit. Although the m digital signals (1201) output from the post filter are synchronized by the clock signal (1110), when there is a difference in the shift time from 0 to 1 and from 1 to 0 as is shown in FIG. 12, a linear relationship between 1 digital unit time (a) and 2 digital unit time (b) is no longer maintained. If the time data is not accurately synchronized bit by bit in a digital acoustic playback system, a problem arises in which noise is generated when speakers are digitally driven. In order to avoid this, it is necessary to maintain the linear timing relationship between different digital unit times by converting the digital signal (1201) which is output from the post filter to a signal (1202) which is re-timed by a re-timing clock signal (1111). By controlling a trigger reset type flip flop with 2 types of clock as is shown in FIG. 12, it is possible to easily realize a re-timing operation.

As is stated above, it is possible to reduce power consumption of an acoustic playback system by a configuration in which different digital modulation circuits for speakers covering different bands are combined. Specifically, it is possible to reduce power consumption by changing the degree of a multi-bit ΔΣ modulator which comprises a digital modulation circuit or changing the frequency of an operation clock corresponding to an oversampling rate at each frequency range. On the other hand, these changes are digitally operated and it is possible to optimize the reduction of power consumption by programmable digital signal processing such as a DSP or by software using a high speed CPU. In other words it is also possible to dynamically change the configuration of the digital acoustic playback system according to the application circumstances of the audio reproduction.

Figure 13:
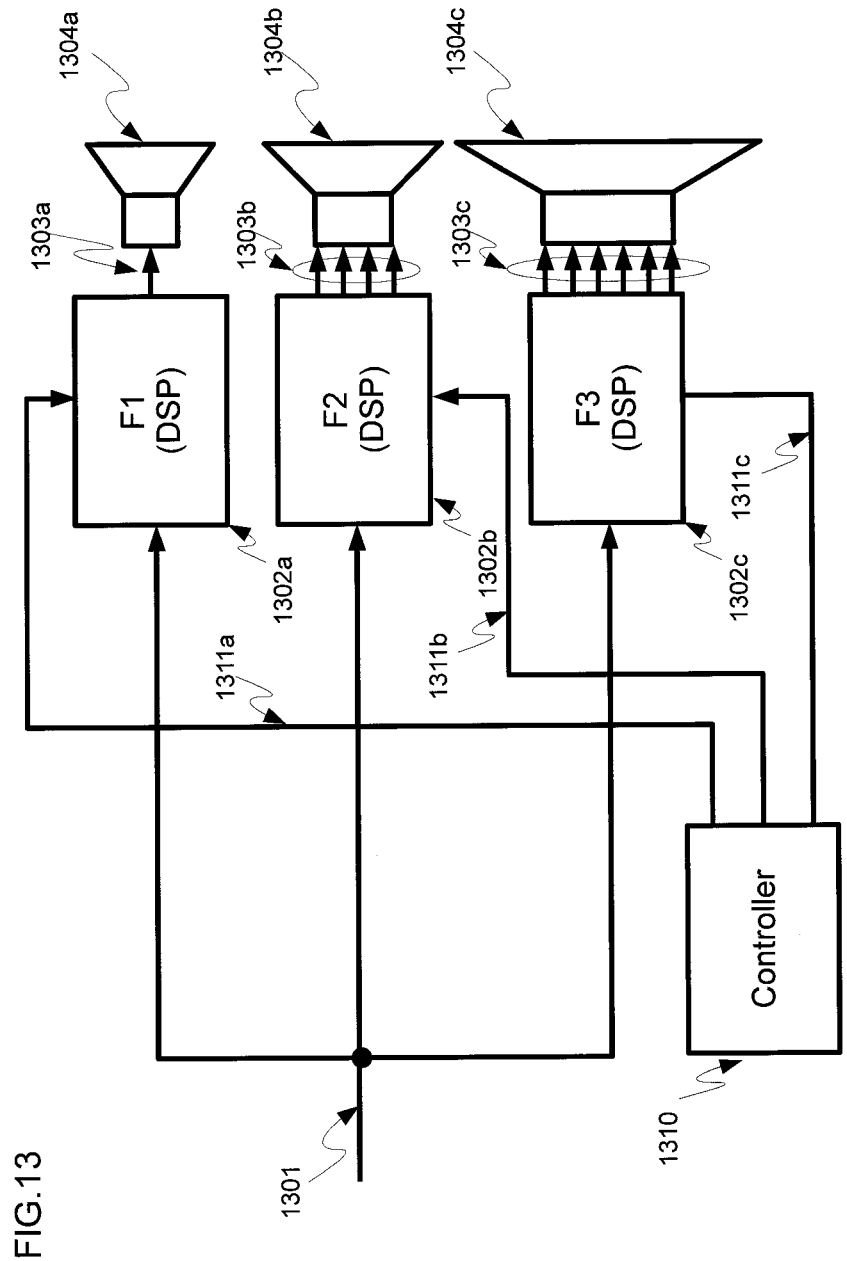
FIG. 13 is a structural diagram of an acoustic playback system related to one embodiment of the present invention.

FIG. 13 shows a ninth embodiment of an acoustic playback system comprised of a plurality of coils driven by a plurality of digital signals. A digital audio signal (1301) is input to DSP circuits (1302a, 1302b, 1302c) which simultaneously provide a digital filter function and a function for carrying out digital modulation processing and outputting a plurality of digital signals. The DSP circuits perform digital signal processing necessary for the digital acoustic playback system and generate digital signals for driving speakers (1303a, 1303b, 1303c) having a plurality of coils (units). These DSP circuits can change the filter characteristics, the degree of a multi-bit ΔΣ modulator, and the oversampling rate according to control signals (1311a, 1311b, 1311c) from a system control circuit (1310).

As is shown in FIG. 13 it is possible to further optimize the power consumption characteristics of an acoustic playback system by dynamically changing the parameters of digital filter functions and digital modulators according to necessity. This is because it is possible to adjust power consumption according to the audio quality required for audio reproduction. For example, when high sound quality is required, the parameters of the digital filter functions and digital modulators can be changed to realize a three way digital acoustic playback system as in FIG. 13. In order to increase the reproduced sound quality, the oversampling rates or modulation degrees of the ΔΣ modulators are increased. On the other hand, in the case of the reproduction of announcement or guide audio, because only reproduction of a mid range band pass is required, the system is reconfigured by changing the parameters of the digital filter functions and digital modulators so that the three way digital acoustic playback system operates as a one way digital acoustic playback system. While the reproduction sound quality becomes poor, it is possible to reduce power consumption without driving the digital circuit which covers for low or high bands or the speaker itself.

Similarly, it is possible to further optimize power consumption characteristics of an acoustic playback system by dynamically changing the parameters of a function such as the frequency characteristics of a digital filter and the parameters of a digital modulator according to the amplitude of a digital audio signal which is input. When the amplitude of the digital audio signal which is input is small, because SNR of a sufficient quality can not be secured as a result, it is possible to change the parameters of the digital modulator and to reduce power consumption by lowering the reproduction quality. Furthermore, while in the present embodiment, the effects of reducing power consumption with regards to a three way digital acoustic playback system is described, the present embodiment can also be applied to an arbitrary acoustic playback system other than a three way system. In addition, while the digital filter function and the digital modulator function are not necessarily implemented entirely by a program on a DSP or on a CPU, but it may be implemented with one part of the functions of the digital filter and digital modulator in a programmable form so that it is possible to dynamically change power consumption. For example, when a digital audio signal which is input corresponds to silence it is possible to use an implementation for stopping a clock input to a digital filter or a digital modulator, and in the case where the digital audio signal which is input is small, it is possible to use an implementation for stopping a low band.

Figure 14A:
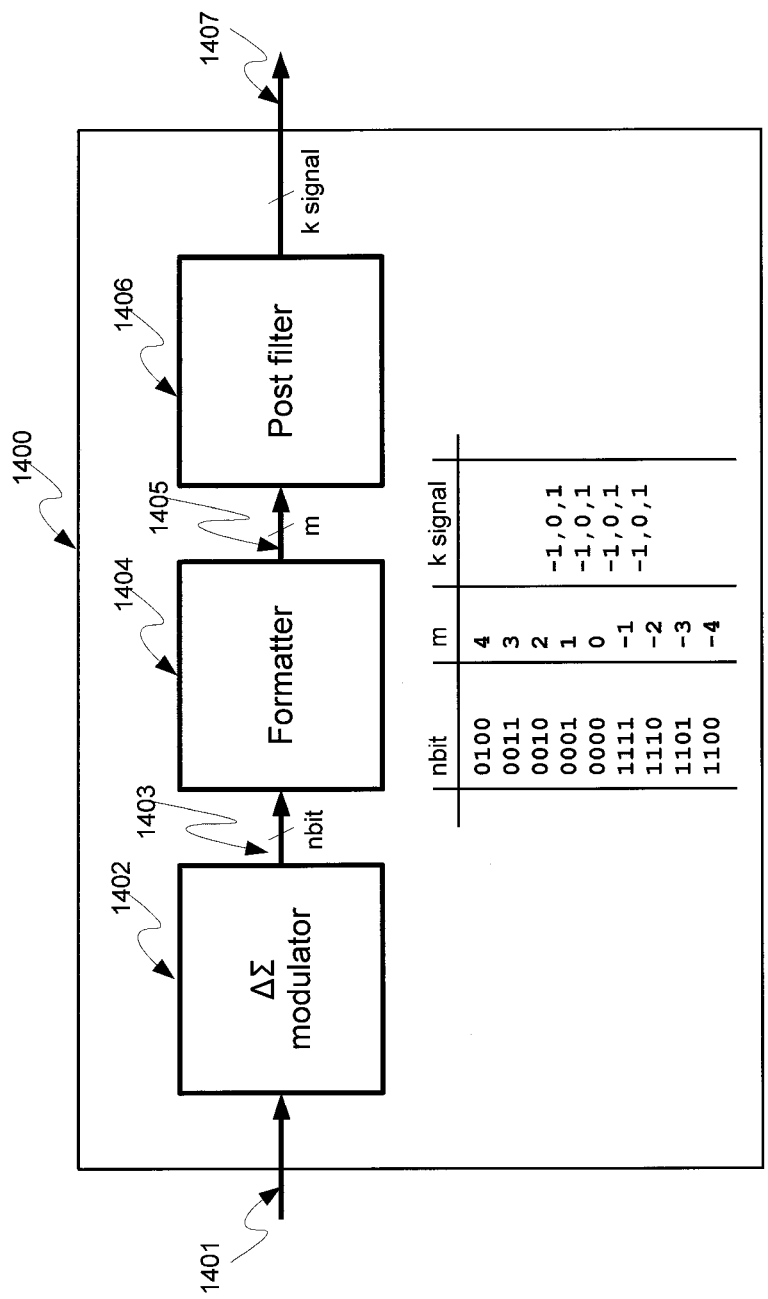
FIG. 14a is an exemplary diagram of the internal circuitry of a digital modulation circuit which is used in a by drive multi-way analog acoustic playback system which uses a digital filter circuit related to one embodiment of the present invention.

Another embodiment of a digital modulation circuit which is supplied as an input with a digital audio signal and outputs a plurality of digital signals is shown in FIG. 14a. A digital audio signal (1401) is converted to an n bit digital signal (1403) by a multi-bit ΔΣ modulator (1402). After the n bit digital signal is converted to m thermometer codes (1405) by a formatter (1404), it is converted to a signal (1407) for driving k coils (units) by a digital signal of 3 values −1, 0, and 1 by a post filter (1406). For example, after converting a 4 bit digital signal to 9 thermometer codes (−4~0~4) by a formatter, it is then converted to a signal for driving 4 coils (units) by 4 digital signals of 3 values −1, 0, and 1 by the post filter (1406).

Figure 14B:
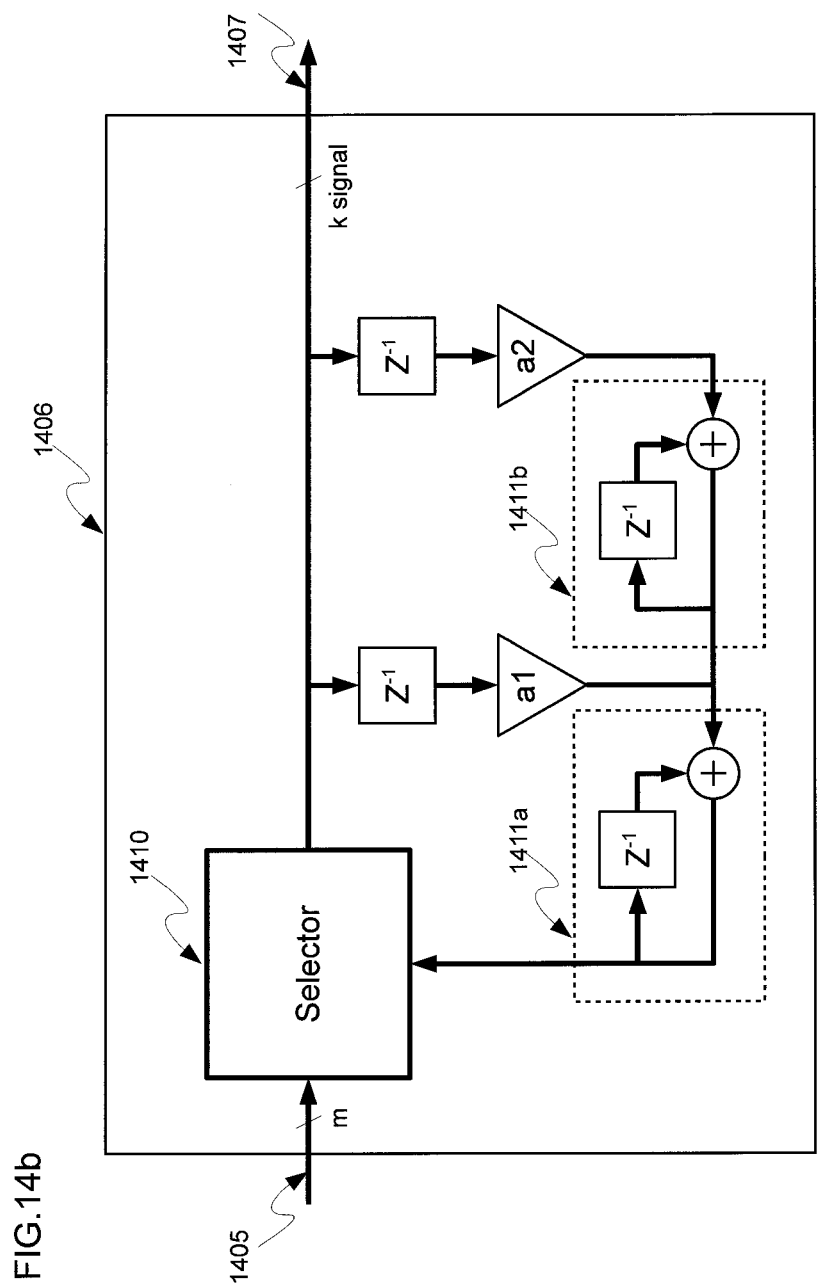
FIG. 14b is an exemplary diagram of a post filter used in the internal circuitry of a digital modulation circuit related to one embodiment of the present invention.

FIG. 14b shows an embodiment of the post filter (1406) used in a digital modulation circuit shown in FIG. 14a. M thermometer codes (1405) are input to a selection circuit (1410) for removing, by a mismatch shaping method, noise caused by manufacturing variations among a plurality of coils (units). The selection circuit (1410) operates so that the output signal (1407) is selected in order of lower usage frequency by calculating the usage frequency of the output signal (407) containing 3 values −1, 0, 1, using at least 2 or more integration circuits (1411a, 1441b) comprising a delay element and an adder. Furthermore, the present invention is also effective in the case where the re-timing circuit such as that shown in FIG. 11 is added to the interior of the digital modulation circuit.

Figure 15:
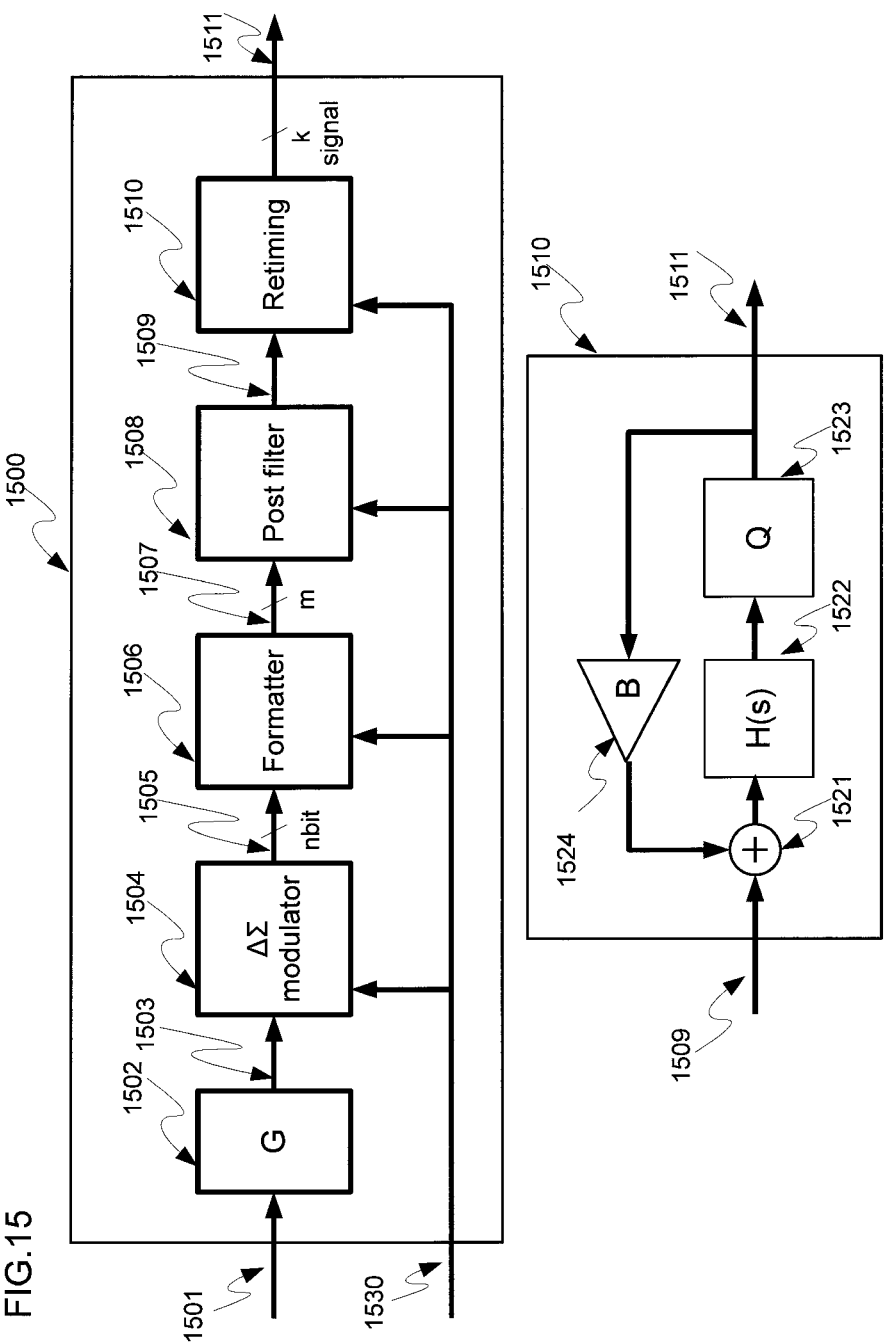
FIG. 15 is an example structural diagram of the internal circuitry of a digital modulation circuit and a circuit structure of a re-timing circuit related to one embodiment of the present invention.

FIG. 15 shows another embodiment of a digital modulation circuit which is supplied as input with a digital audio signal and outputs a plurality of digital signals. After a digital audio signal (1501) is converted to a digital signal (1503) which is adjusted to the efficiency of a speaker by a digital gain circuit (1502), the signal is then converted to an n bit digital signal (1505) by a multi-bit ΔΣ modulator (1504). After the n bit digital signal is converted to m thermometer codes (1507) by a formatter (1506) it is converted to a signal (1509) for driving k coils (units) by a digital signal of 3 values −1, 0, and 1 by a post filter (1508). Following this, time data of the k digital signals are accurately synchronized bit by bit and the k signals are converted to a digital driving signal (1511) with 3 values for driving k coils (units). Each circuit is controlled by a clock signal (1530) and a re-timing circuit is configured with a feedback circuit which is comprised of an adder (1521), a transfer function (1522), a quantizer (1523) and a feedback coefficient circuit (1524). In the case where the digital drive signal (1511) is supplied to a speaker, distortions in a wave shape may be produced in the digital drive signal (1511) and noise may be produced due to an output resistance of the digital drive circuit, which may effect operation speed, or jitter the clock signal (1530). By appropriately selecting a transfer function H (s), it is possible to reduce this noise being generated at the time of digital driving. The quantizer (1523) can be realized by a comparator and because the shift timing of the comparator is determined by the output of the transfer function (1522) independently from a clock, the largest output margin of error of a consecutive time reproduction signal which is fed back by a feed back circuit can be easily controlled to a minimum. Furthermore, it is possible to change an output gain by changing a feedback coefficient circuit. With this function it is possible to compensate for the difference in efficiency among a plurality of speaker units. As a further but separate merit, because there is no change in the wave shape of the output signal due to a power supply voltage it is possible to reduce the generation of noise from the power supply.

In the first to ninth embodiments of the present invention, the examples shown in FIG. 11, FIG. 14a, FIG. 14b, or FIG. 15 can be used as a digital modulation circuit included as a constituent element of a digital acoustic playback system.

Figure 16:
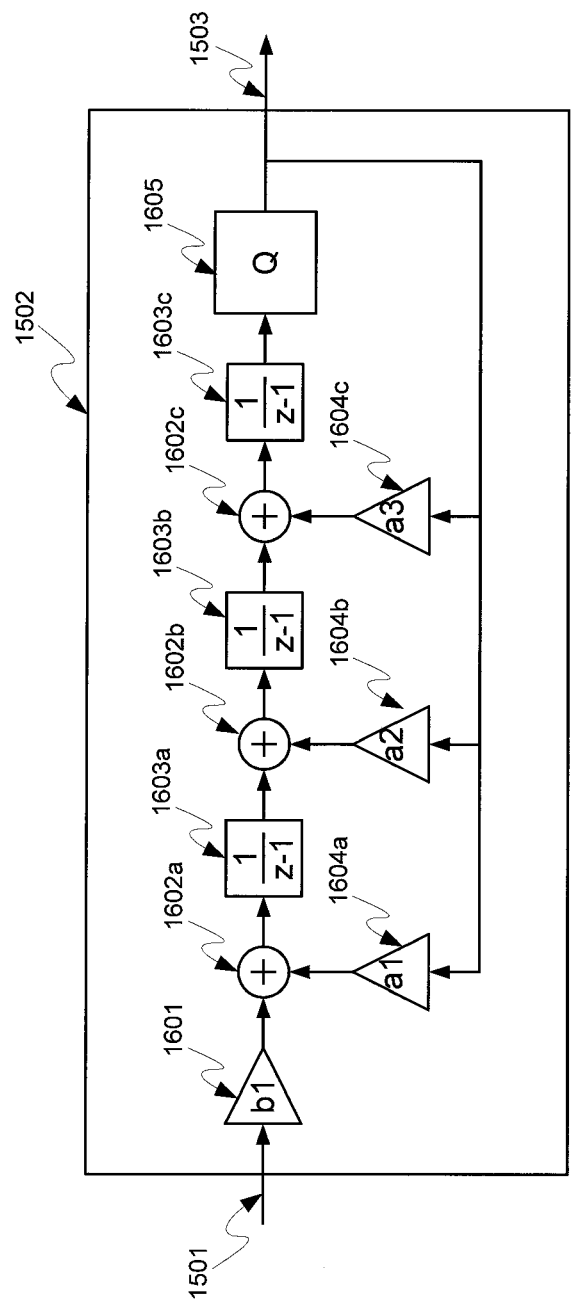
FIG. 16 is an exemplary diagram of a structure of the internal circuitry of a multi-bit $\Delta\Sigma$ modulator comprised of a digital modulation circuit related to one embodiment of the present invention.

FIG. 16 shows an embodiment of a multi-bit ΔΣ modulator (1502), which is shown in FIG. 15, used in a digital modulation circuit which is supplied as an input with a digital audio signal and outputs a plurality of digital circuits. After a digital audio signal (1501) passes through a coefficient amplifier (1601) it is added (1602a) in a coefficient amplifier (1604a) for feed back and input to an integrator (1603a). The degree is defined by the number of steps of the integrators which comprise the multi-bit ΔΣ modulator. The higher the degree is the higher the effect of shifting quantization noise (an effect in which frequencies of quantization noise becomes higher) but the scale of the circuit becomes larger. A signal from the last integrator is quantized by a quantizer (1605) and output (1503). The multi-bit ΔΣ modulator provides a function for decimating an input digital audio signal to an appropriate number of digital signals using an oversampling technology. For example, suppose that a digital audio signal with 16 bit CD quality is input and that a 9 level signal (−4, −3, −2, −1, 0, 1, 2, 3, 4) is output. The present invention is not limited to the multi-bit ΔΣ modulator in the example shown in FIG. 16 and a multi-bit ΔΣ modulator having an arbitrary structure can be used in the embodiments of the present invention.

Figure 17A:
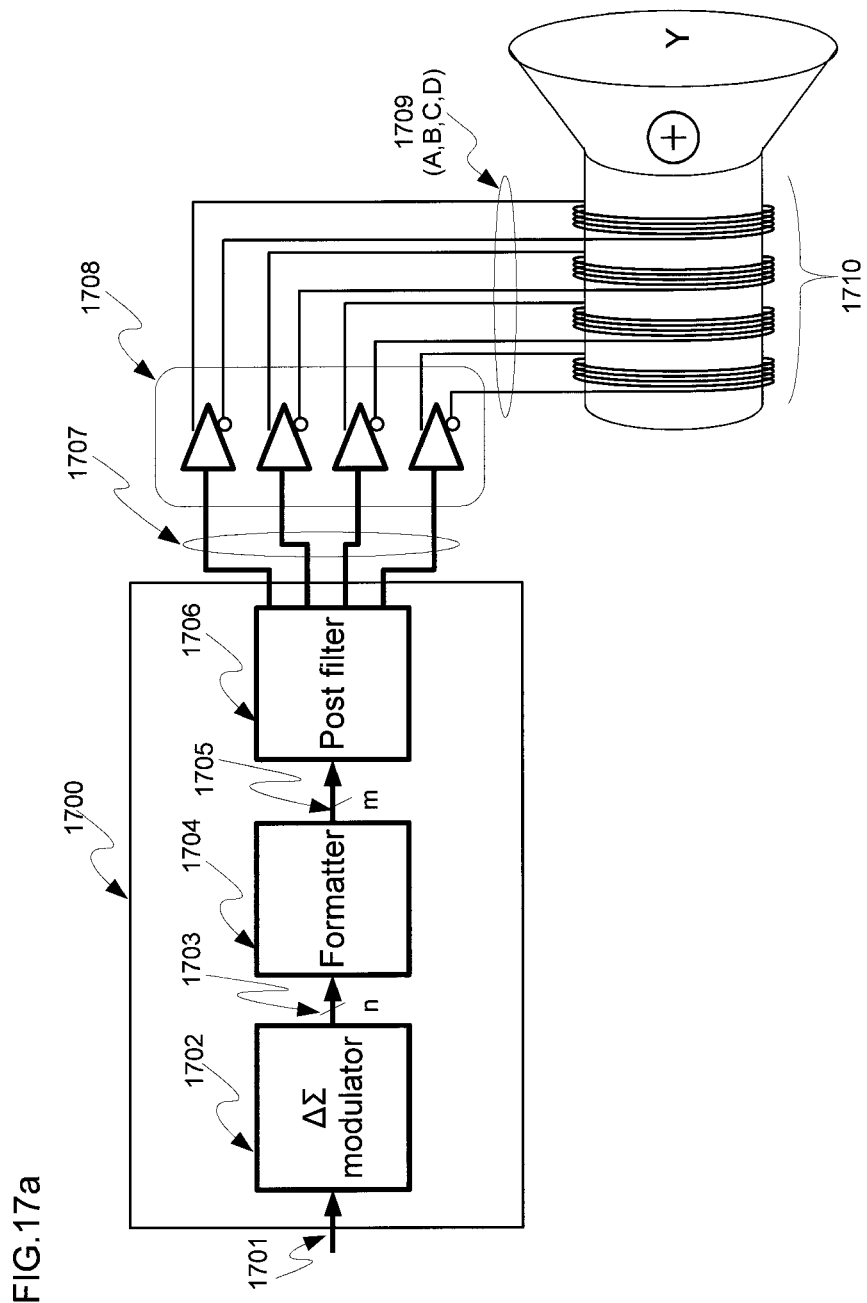
FIG. 17a is a structural diagram of a speaker having a plurality of coils used in an acoustic playback system related to one embodiment of the present invention.

FIG. 17a shows an embodiment of a speaker system having a plurality of coils covering a plurality of different bands in an embodiment of the present invention. A digital audio signal (1701) which is input is converted to an n bit digital signal (1703) by a multi-bit ΔΣ modulator (1702). After being converted to m thermometer codes (1705) by a formatter (1704) the n bit digital signal is converted to a signal (1707) for digitally driving a plurality of coils (units) by a post filter (1706). The post filter removes, by a miss match shaping method, noise which becomes a problem when driving the plurality of coils (units), caused by manufacturing variations among the plurality of coils (units). Signals (1707) from the post filter are each input to a drive circuit (1708), a plurality of 3 value (+1, 0, −1) driving signals are output from the drive circuit, and the driving signals (1709) are supplied to each coil of a speaker (1710) formed by a plurality of coils. In the present embodiment, they are supplied to 4 coils (A, B, C, D).

Figure 17B:
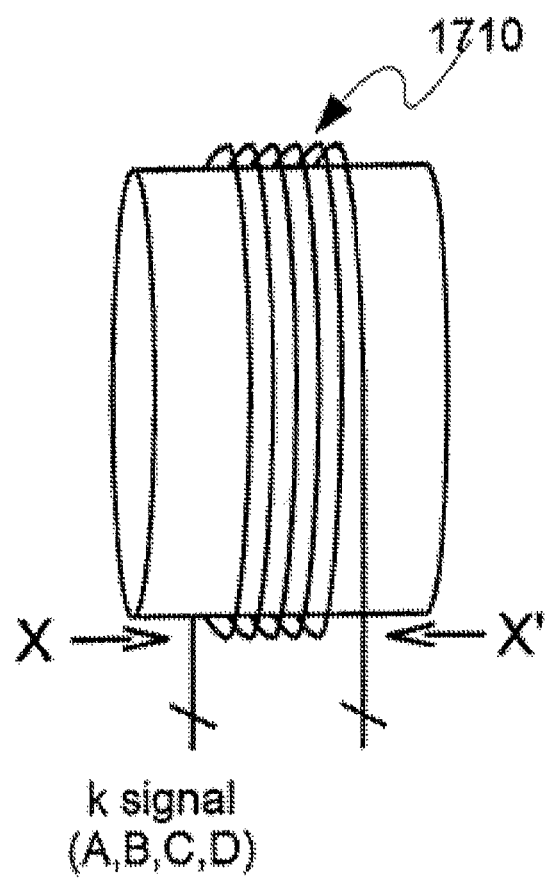
FIG. 17b is a structural diagram of a voice coil of a speaker having a plurality of coils used in an acoustic playback system related to one embodiment of the present invention.
Figure 17C:
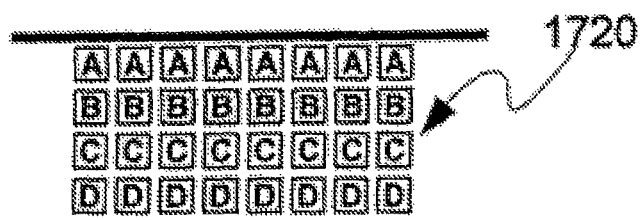
FIG. 17c is an exemplary diagram of winding voice coils of a speaker having a plurality of coils used in an acoustic playback system related to one embodiment of the present invention.
Figure 17D:
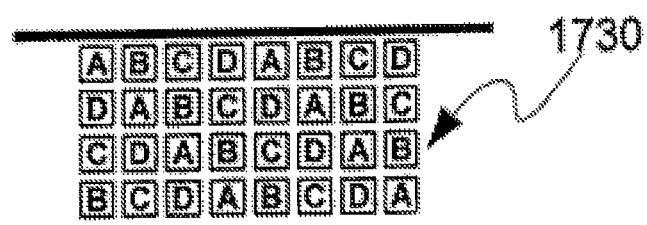
FIG. 17d is another exemplary diagram of winding voice coils of a speaker having a plurality of coils used in an acoustic playback system related to one embodiment of the present invention.

FIG. 17b shows an example of a voice coil of a speaker having a plurality of coils covering a plurality of different bands which can be used in an embodiment of the present invention. In the present embodiment, k (for example, 4 including A, B, C, and D) driving coils (1710) are wound together in a bunch. FIG. 17c shows a cross sectional view (1720) of an example of the coil winding method. In other words, one part of a cross section of a planar surface including the coil axis is shown. A characteristic of the present example is that each coil is wound from the inner layer to the outer layer in the order of A coil, B coil, C coil and, D coil. In addition, FIG. 17d shows a cross sectional view of another example of a coil winding method. In this example, coils from A to D together are wound in order from the interior. That is, when the coils are wound in the order A, B, C, D, A, B, C, D on a certain layer, the coils are wound in the order D, A, B, C, D, A, B, C on an adjacent layer. In addition, the coils are wound in the order C, D, A, B, C, D, A, B on a further adjacent layer. By using these examples, it is possible to compactly wind each voice coil of a speaker having a plurality of coils covering a plurality of different bands. In other words, it is possible to reduce any variation in the characteristics of each coil. Although cross sectional views are shown of the cases where square cross sectional lines are used as the voice coils in FIG. 17b and FIG. 17c, an arbitrary cross sectional shape such as a round line can be used as the line material.

Figure 18:
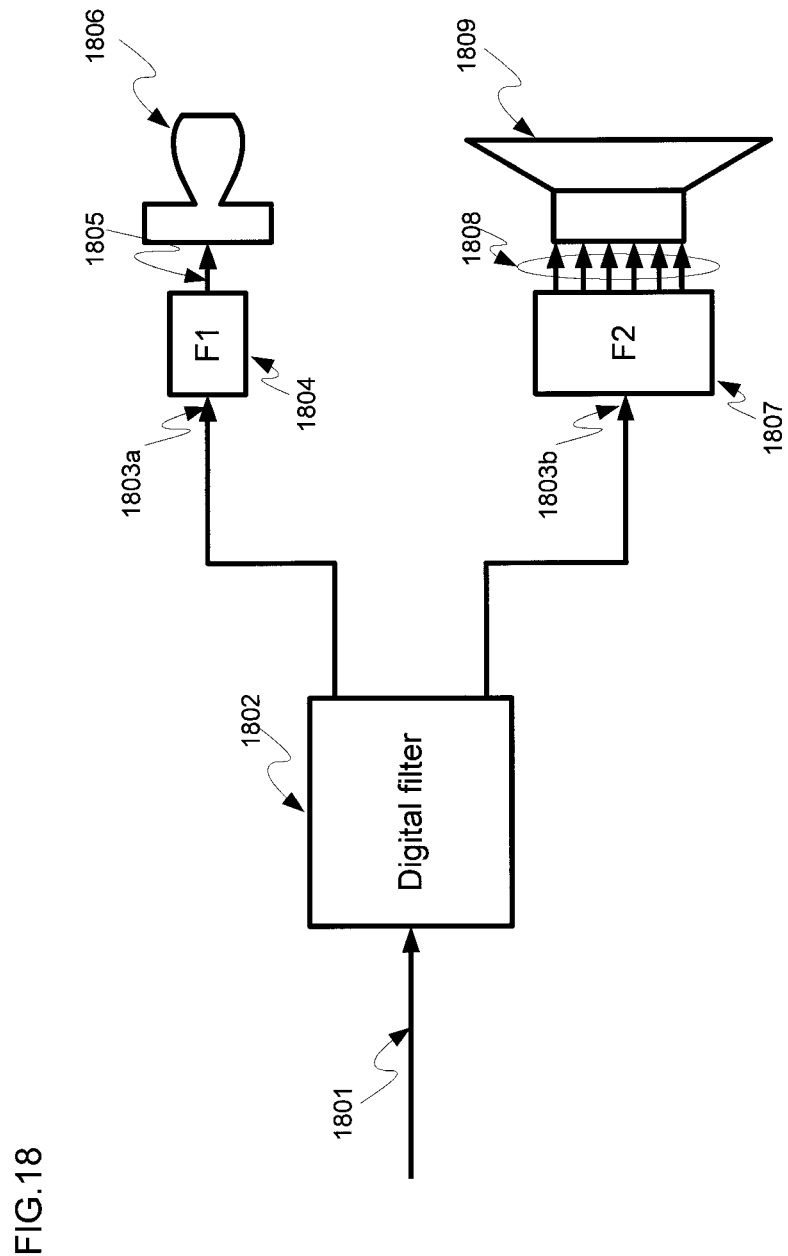
FIG. 18 is a structural diagram of an acoustic playback system related to one embodiment of the present invention.

FIG. 18 shows a tenth embodiment of the present invention of an acoustic playback system comprised of a plurality of coils driven by a plurality of digital signals. A digital audio signal (1801) is divided to a plurality of digital signals (1803a, 1803b) corresponding to a plurality of frequency bands by a digital filter (1802). The plurality of digital signals corresponding to the plurality of frequency bands are converted to a plurality of digital signals (1808) by a digital modulation circuit (1807) which is supplied as an input with the digital audio signal and outputs a plurality of digital signals, a digital modulation circuit (1804) which outputs a plurality of digital signals, a speaker or an earphone (1806) which have a pair of coils (units) which are supplied with digital signals (1805) as inputs, and a speaker (1809) having a plurality of coils (units) covering a plurality of different bandwidths. Furthermore, the earphone (1806) has a lower reproduction sound pressure than the speaker (1809) and is shown for illustrating an example of different reproduction sound pressures.

Furthermore the speaker or the earphone (1806) has one or a plurality of coils (units). Corresponding to this, the number of digital signals output by the digital modulation circuit (1804) is determined. In addition, a coil generally has a pair of terminals, to each terminal of which a plus signal line or a minus signal line is connected.

According to the tenth embodiment, the number of coils (units) of the speaker or the earphone (1806) can be reduced compared to the number of coils (units) of the speaker (1809). Thereby, in the case of the reproduction of high volume and high sound quality audio on a mobile device for example, speakers having a plurality of coils (units) are driven. On the other hand in the case where the earphone etc.

is used it is possible to achieve a reduction in power consumption by using a lower number of digital signals such as a pair.

Figure 19:
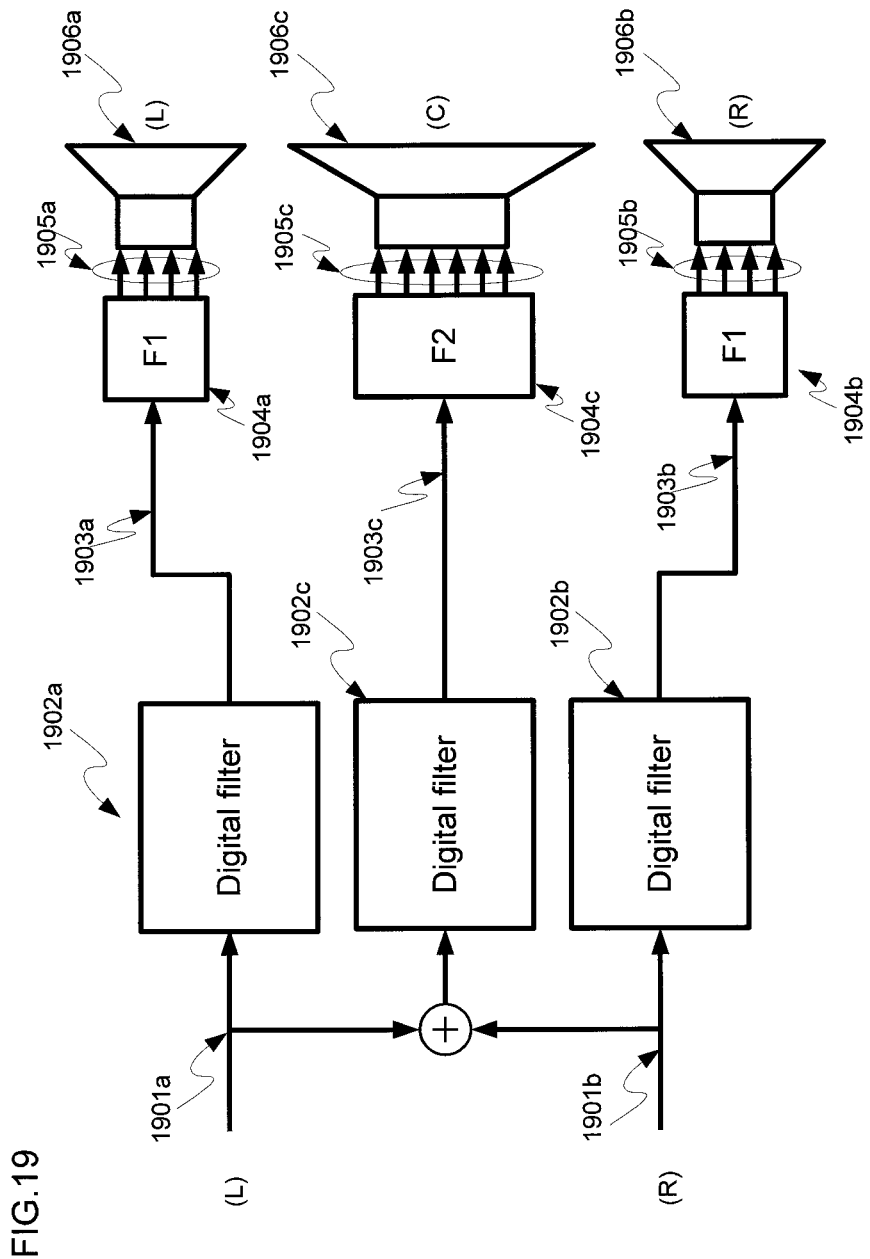
FIG. 19 is a structural diagram of an acoustic playback system related to one embodiment of the present invention.

FIG. 19 shows an eleventh embodiment of an acoustic playback system comprised from a plurality of coils driven by a plurality of digital signals. A low band digital audio signal (1901c) is generated from stereo digital audio signals (1901a, 1901b) after L and R are added. Each digital signal is divided into a plurality of digital signals corresponding to L, R, and two types of frequency bands, low and mid/high range, by low band digital filters (1902a, 1902b, 1902c). The mid/high range band digital signals (1903a, 1903b) which are output from the digital filters are converted to a plurality of independent L and R digital signals (1905a, 1905b) by digital modulation circuits (1904a, 1904b) which are supplied as inputs with digital audio signals and output a plurality of digital signals, and drive speakers (1906a, 1906b) which have a plurality of coils (units) covering the mid/high range bands. On the other hand, the low range band digital signal (1903c) which is output from the digital filter is converted to a plurality of digital signals (1905c) by digital modulation circuit (1904c) which is supplied as an input with a digital audio signal and outputs a plurality of digital signals, and drives a speaker (1906c) which has a plurality of coils (units) covering a low range band. Generally, because a low range band audio signal is similarly included in stereo L and R, a problem does not arise even when L and R are added regarding low band signals. By adopting the configuration in FIG. 19, it is possible to further optimize the power consumption characteristics of a digital acoustic playback system. In the present embodiment, effects related to a stereo two way digital acoustic playback system are explained. However, the present embodiment can also be applied to an arbitrary acoustic playback system other than a two way system. The present embodiment can also be applied to an arbitrary acoustic playback system supplied with an audio signal having an optional number of channels more than 2 channels (stereo).

Figure 20:
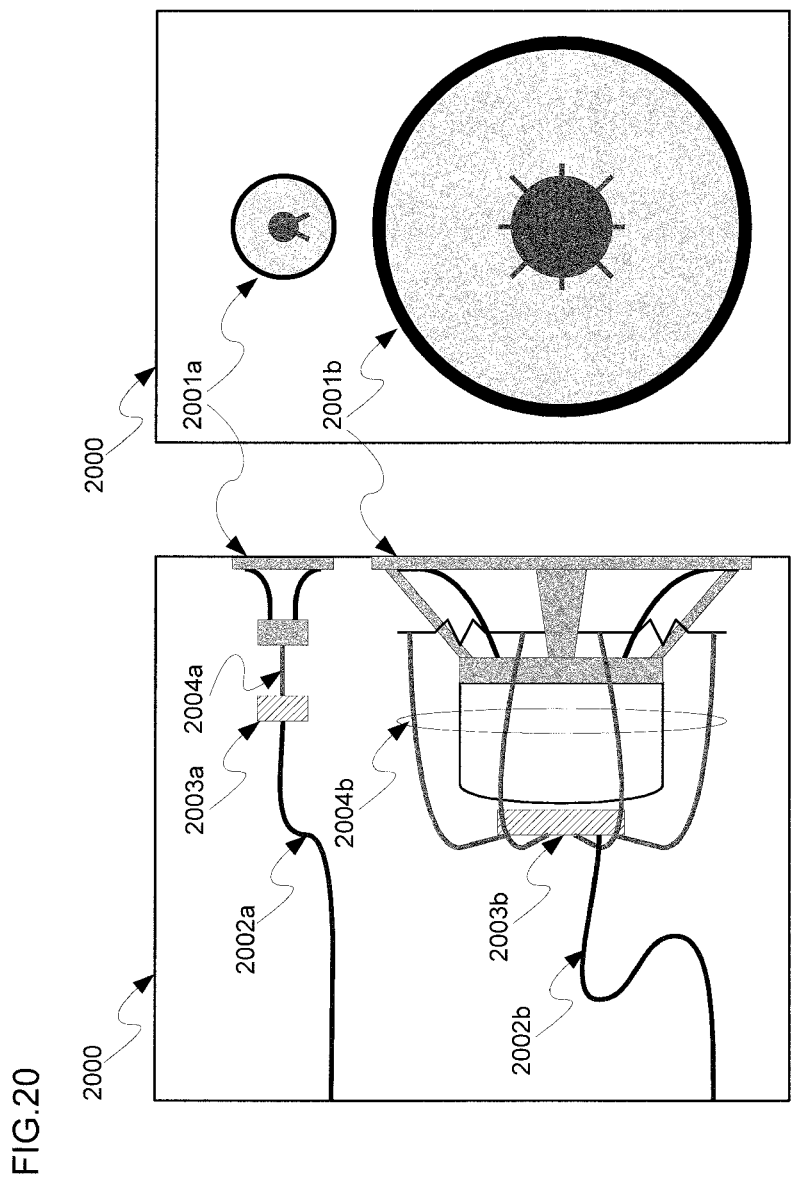
FIG. 20 is a structural diagram of a speaker used in an acoustic playback system related to one embodiment of the present invention.

A twelfth embodiment of the acoustic playback system comprised from a plurality of coils which are driven by a plurality of digital signals is shown in FIG. 20. A cross section and an entire surface of a 2 way speaker box (2000) are shown. A speaker (2001b) which has a plurality of coils (units) and covers a mid, low sound range, and a speaker (2001a) which has at least a pair of more of coils (units) and covers a high sound range are arranged in the speaker box. In addition, a digital modulation circuit (2003a) is arranged behind the speaker (2001a) and a digital modulation circuit (2003b) is arranged behind the speaker (2001a). In other words, a digital modulation circuit is arranged near a speaker. A plurality of digital audio signals (2002a, 2002b) corresponding to the frequency ranges of the speakers are converted to a plurality of digital signals (2004a, 2004b) by digital modulation circuits (2003a, 2003b) which are supplied as inputs with digital audio signals and output at least one digital signal, and drive the speaker (2001b) which has a plurality of coils (units) which have a mid, low sound range and the speaker (2001a) which has at least one coil (one unit) which has a high sound range.

In this way, because it is possible to reduce the distance of a signal wire in which a digital modulation circuit drives a speaker having a plurality of coils (units) by arranging near a speaker a digital modulation circuit which is supplied as an input with a digital audio signal and outputs at least one digital signal, it is possible to reduce the strength of EMI (Electromagnetic Interference) emitted in space when driving speakers. Because EMI causes a noise when receiving electrical waves of a radio or a wireless mobile, it is desired that the strength of EMI is decreased in mobile acoustic devices such as an automobile acoustic product or a mobile phone.

An effect regarding a two way stereo digital acoustic playback system is explained above. However, the present embodiment is not limited to a two way digital acoustic playback system, the present embodiment is applicable to acoustic playback systems of an arbitrary number of ways other than 2 and the present invention is also applicable to a digital acoustic playback system which is supplied as an input with audio signals of an arbitrary number more than 2 channels (stereo).

Figure 21:
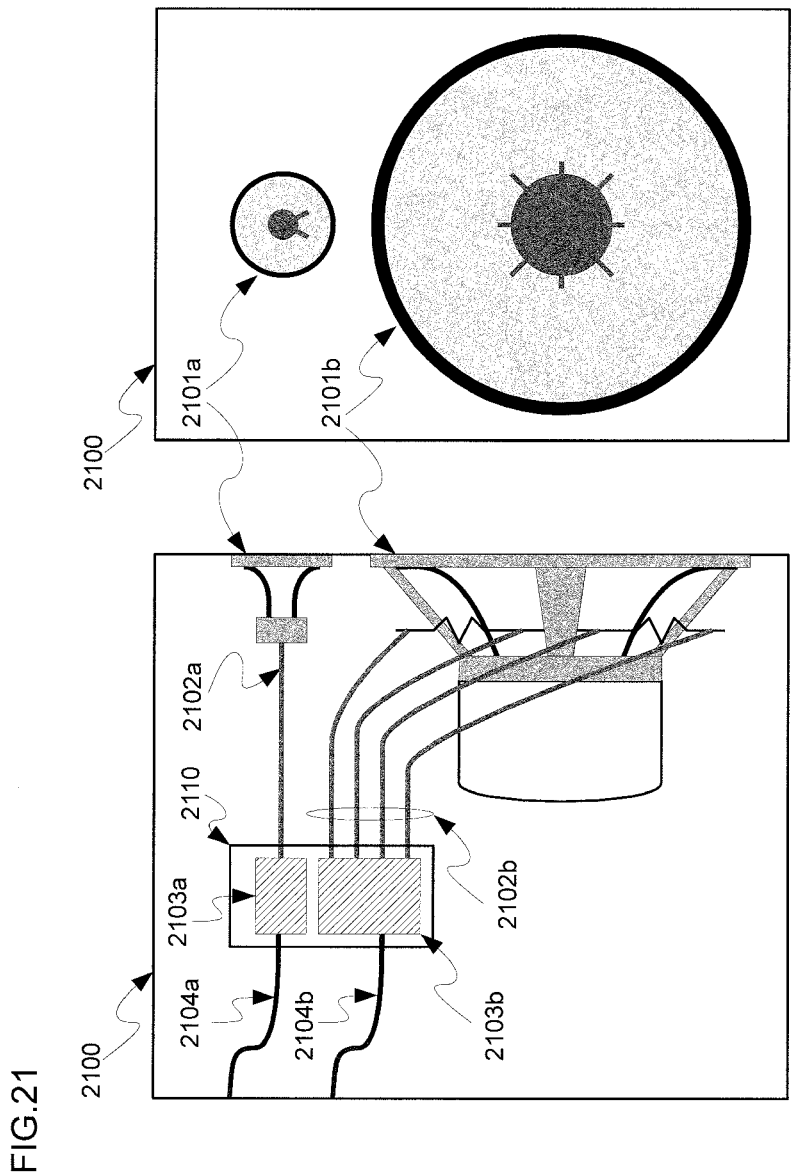
FIG. 21 is a structural diagram of a speaker used in an acoustic playback system related to one embodiment of the present invention.

A thirteenth embodiment of an acoustic playback system comprised of a plurality of coils driven by a plurality of digital signals is shown in FIG. 21. FIG. 21 shows a cross sectional view and a front view of a two-way speaker box (2100). The speaker box is arranged with a speaker (2101b) which has a plurality of coils (units) which covers a mid low sound range, and a speaker (2101a) which has at least one coil (one unit) which covers a high sound range. In addition, a module substrate (2110) with integrated digital modulation circuits (2103a, 2103b) is arranged near the speakers (2101a, 2101b). In addition, the plurality of digital audio signals (2102a, 2102b) corresponding to the frequency bandwidths of the speakers are converted to a plurality of digital signals (2104b, 2104b) by the digital modulation circuits (2103a, 2103b), each of which is supplied as an input with digital audio signals and output at least one digital signal, and drive the speaker (2101b) which has a plurality of coils (units) which covers a mid low sound range, and the speaker (2101a) which has at least one coil (one unit) which covers a high sound range.

In this way, because it is possible to reduce the distance of a signal wire by which the digital modulation circuit drives a speaker having a plurality of coils (units) by arranging the module substrate (2110) integrated with the digital modulation circuits (2103a, 2103b) near the speaker, it is possible to reduce the strength of EMI (electromagnetic waves) emitted in the air when driving the speaker.

Because EMI is the cause of noise when receiving radio or mobile wireless waves, it is preferred that the strength of EMI be reduced in mobile audio devices such as in-car acoustic products or mobile phones.

In the present embodiment, the effects of a stereo two-way digital acoustic playback system were described above. However, the present embodiment is not limited to a two way digital acoustic playback system. The present embodiment can also be applied to an acoustic playback system having an arbitrary number of ways apart from two, and the present invention can be applied to an arbitrary digital acoustic playback system input with audio data having two or more channels (stereo). In addition, by arranging the module substrate after the voice coil or on the front of the speaker (a center cone), it is possible to reduce the distance between the coil and the driving module. By reducing this distance to a minimum it is possible to reduce to a minimum the strength of EMI.

Figure 22:
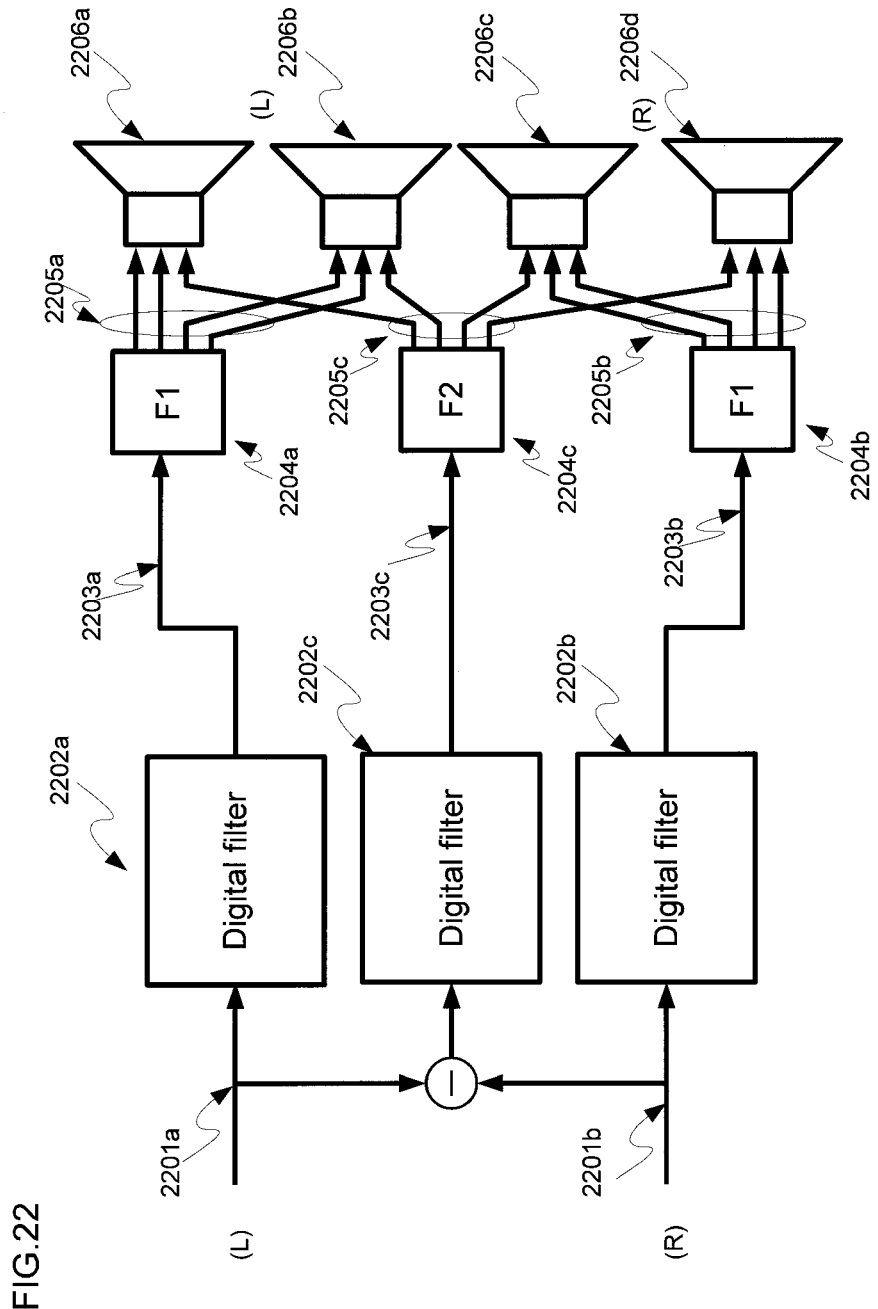
FIG. 22 is a structural diagram of an acoustic playback system related to one embodiment of the present invention.

A fourteenth embodiment of an acoustic playback system comprised of a plurality of coils driven by a plurality of digital signals is shown in FIG. 22. First, a digital audio signal (2201c) obtained from by a subtraction process of an L digital signal and an R digital signal from stereo digital signals (2201a, 2201b) is produced. The digital audio signal (2201c) obtained from this subtraction process is sometimes called a "quasi-surround digital audio signal." Each digital signal is divided into a plurality of digital signals corresponding to each frequency band by digital filers (2202a, 2202b, 2202c) which are dedicated to process the L, R and quasi-surround digital audio signals. The L and R digital signals (2203a, 2203b) which are output from the digital filters (2202a, 2202b) are converted to a plurality of L and R digital signals by digital modulation circuits (2204a, 2204b) which are supplied as inputs with digital audio signals and output a plurality of digital signals. The digital modulation circuits (2204a, 2204b) operate independently. The quasi-surround digital signal (2203c) output from the digital filter (2202c) is converted to a plurality of digital signals (2205c) by a digital modulation circuit (2204c) which is supplied as an input with a digital audio signal and outputs a plurality of digital signals.

Digital signals (2205a, 2205b) from digital filters (2202a, 2202b) each of which processes L and R digital signals respectively, and the digital signal (2202c) from the digital filter (2202c) which processes the quasi-surround digital signal, are combined and input to the speakers (2206a, 2206b, 2206c, 2206d) which have a plurality of coils (or actuators). The digital signal from the digital filter (2202c) which processes the quasi-surround digital signal is synthesized by a speaker which has the L and R digital signals and a plurality of coils (actuators). An acoustic signal generated by each of a digital signal from the digital filter (2202c) which processes the quasi-surround digital signal and the L and R signals is synthesized in the speaker. In this way, it is possible to further increase the quasi-surround effects while optimizing the power consumption characteristics of the digital acoustic playback system.

A surround effect using a stereo sound source is described above as an effect of the present embodiment. However, the present embodiment is not limited to stereo and it is also possible to apply to present embodiment to a multi-channel optional surround acoustic playback system other than stereo. By synthesizing the data from a surround sound source and the data from a stereo main sound source by a speaker, it is possible to reproduce a surround signal just by a front array speaker.

In addition, the effect obtained by combining signals and inputting a digital speaker to a speaker having coils is described above as an effect of the present embodiment. However, the present embodiment can also be applied to an electrical acoustic vibration conversion element (for example, an actuator such as a static electric element, a piezo element, or a magnetostrictor) other than coils.

Figure 23A:
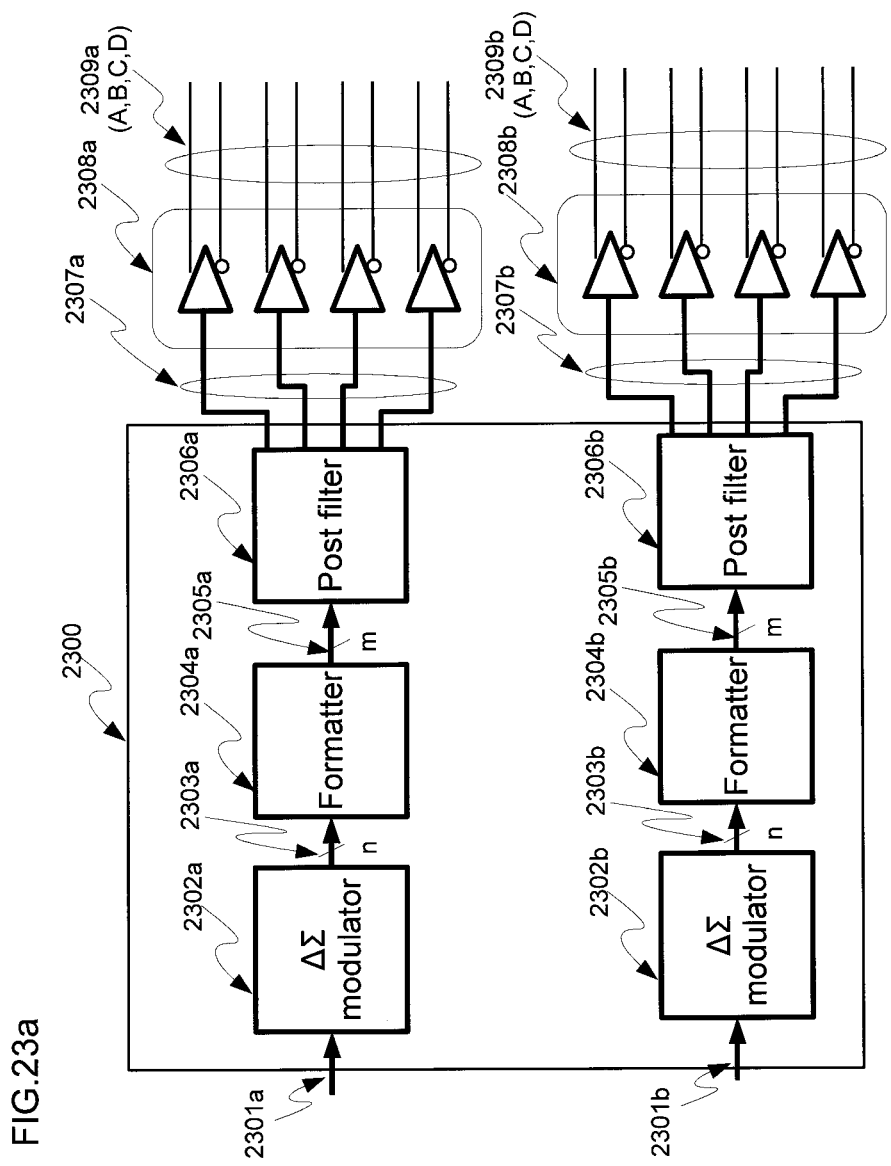
FIG. 23a is a structural diagram of an acoustic playback system related to one embodiment of the present invention.

A configuration of a system for a speaker having a plurality of coils supplied as inputs with a plurality of digital signals from a plurality of sound sources related to one embodiment of the present invention is shown in FIG. 23a. The plurality of digital audio signals (2301a, 2301b) from the plurality of sound sources which are input are converted to a plurality of n bit digital signals (2303a, 2303b) by a plurality of multi-bit ΔΣ modulators (2302a, 2302b). After the plurality of n bit digital signals are converted to a plurality of m thermometer codes (2305a, 2305b) by a plurality of formatters (2304a, 2304b), they are converted to a plurality of digital drive signals (2307a, 2307b) which drive a plurality of coils (units). A post filter removes by a mismatch shaping method, noise which is caused by manufacturing variations between the plurality of coils (units) which becomes a problem when driving the plurality of coils (units). The signals (2307a, 2307b) from the post filters (2306a, 2306b) are each input to drive circuits (2308a, 2308b) and a plurality of three-level (+1, 0, 1) driving signals (2309a, 2309b) are output from the drive circuits (2308a, 2308b). In the present embodiment, four drive signals (A, B, C, D) are output for one digital signal.

Figure 23B:
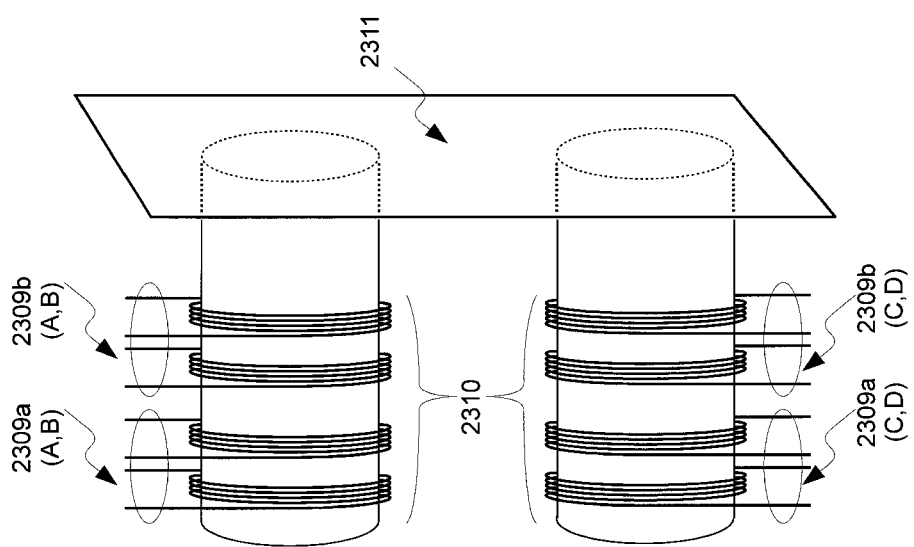
FIG. 23b is an example diagram of the structure of a speaker which has a plurality of coils corresponding to a plurality of sound sources which can be used in one embodiment of the present invention.

An example of a speaker which has a plurality of coils corresponding to a plurality of sounds sources which can be used in one embodiment of the present invention is shown in FIG. 23b. Two vibratos around which the coils (2310) are bunched together and wound and which are driven by the four drive signals (A, B, C, D) are shown in FIG. 23b. Each vibrator is respectively connected to one vibration plate (2311). A signal (A, B) of part of the driving signal (2309a) from a first sound source and a signal (A, B) of part of the driving signal (2309b) from a second sound source drive the first vibrator and a signal (C, D) of part of the driving signal (2309a) from the second sound source and a signal (C, D) of part of the driving signal (2309b) from the second sound source drive the second vibrator.

Because each vibrator is respectively connected to one vibration plate (2311), signals generated by data from the first sound source and data from the second sound source are synthesized in the vibration plate (2311) via a plurality of vibrators. Therefore, it is possible to effectively synthesize data from a plurality of sound sources while reducing the variation in each coil. For example, if data of a main sound source is provided to a first sound source and data of a secondary sound source is provided to a second sound source, it is possible to easily synthesize an acoustic while using one speaker. It is also possible to easily and dynamically control ON/OFF surround effects by digitally controlling the first and the second sound source. In addition, if a main audio is provided to the first sound source and a secondary audio (foreign language or guidance information) is provided to the second source, then it is also possible to easily synthesize audio data while using one speaker.

In the present embodiment, an example is shown where two vibrators are connected to one vibration plate. However, the present invention is not limited to this example. The present embodiment can also be applied in the case where two or more optional electrical acoustic vibration conversion elements are used (for example, an actuator such as a static electrical element, a piezo element or a magnetostrictor).

What is claimed is:

1. A speaker box comprising:
 a housing having an opening;
 a digital speaker being input k number of digital signals and disposed in the opening;
 a digital modulation circuit driving the digital speaker formed in the housing, wherein the digital modulation circuit includes a filter converting an input digital audio signal and outputting a digital signal of m bits; and
 k number of driving circuits, one part of the digital signal of m bits being input to the k number of driving circuits respectively, and the k number of driving circuits outputting the k number of digital signals to the digital speaker,
 wherein the digital modulation circuit further includes a ΔΣ modulation circuit and is disposed in close proximity to the digital speaker,
 wherein the digital modulation circuit filters a digital signal of a certain frequency bandwidth from the digital audio signal being input and performs noise shaping and miss match shaping, and
 wherein the digital modulation circuit further includes a controller controlling parameters of one or more digital signal processors operable upon a frequency bandwidth filtered by the digital modulation circuit, a noise shaping oversampling rate, and a degree of miss match shaping.

2. The speaker box according to claim 1, wherein the digital modulation circuit filters a digital signal of a certain frequency bandwidth from the digital audio signal being input and performs noise shaping and miss match shaping, and, wherein the digital modulation circuit further includes:
a controller controlling parameters of one or more of a frequency bandwidth filtered by the digital modulation circuit, a noise shaping oversampling rate, and a degree of miss match shaping.

3. The speaker box according to claim 1, wherein the digital modulation circuit is disposed at the rear of the opening of the digital speaker.

4. The speaker box according to claim 1, wherein the digital signal of m bits is a digital signal of a plurality of values.

5. The speaker box according to claim 4, wherein the digital signal of a plurality of values is a digital signal of 3 values +1, 0, and −1.

* * * * *